US012117979B1

(12) United States Patent
Kolev et al.

(10) Patent No.: US 12,117,979 B1
(45) Date of Patent: Oct. 15, 2024

(54) TIMESTAMP-BASED DELETIONS FOR INTERDEPENDENT DATA OBJECTS

(71) Applicant: SAP SE, Walldorf (DE)

(72) Inventors: Mitko Kolev, Walldorf (DE); Syed Muhammad Kumail Raza, Heidelberg (DE); Markus Muenkel, Reilingen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/229,102

(22) Filed: Aug. 1, 2023

(51) Int. Cl.
*G06F 16/24* (2019.01)
*G06F 16/215* (2019.01)
*G06F 16/2455* (2019.01)

(52) U.S. Cl.
CPC ........ *G06F 16/215* (2019.01); *G06F 16/2455* (2019.01)

(58) Field of Classification Search
CPC ........................... G06F 16/215; G06F 16/2455
See application file for complete search history.

(56) References Cited

U.S. PATENT DOCUMENTS 5,659,754 A * 8/1997 Grove ..................... G06F 8/433 717/146
10,348,810 B1 * 7/2019 Florissi ............... H04L 67/1097
10,366,111 B1 * 7/2019 Florissi ................. G06F 16/951
10,917,352 B1 * 2/2021 Hanes ..................... H04L 69/16
2006/0053136 A1 * 3/2006 Ashiri ................. G06F 16/2465
2013/0346572 A1 * 12/2013 Jain ....................... G06F 9/5088 709/223
2018/0336080 A1 * 11/2018 Jain ......................... G06F 11/36
2019/0180499 A1 * 6/2019 Caulfield ................ G06T 15/06
2019/0188046 A1 * 6/2019 Florissi ............... H04L 63/0209
2019/0294617 A1 * 9/2019 Florissi ................... G06F 16/27
2020/0225970 A1 * 7/2020 Mohanta ............. G06F 9/45558
2021/0203557 A1 * 7/2021 Cherif ..................... H04L 41/12
2022/0078006 A1 * 3/2022 Krishnamurthy ..... H04L 9/3239
2023/0274834 A1 * 8/2023 Holve .................... G16H 10/60 705/2

* cited by examiner

*Primary Examiner* — Eliyah S. Harper
(74) *Attorney, Agent, or Firm* — Klarquist Sparkman, LLP

(57) ABSTRACT

Techniques and solutions are provided for identifying sets of related data, such as for a data deletion process. Data objects can be considered as having parent-child relationships, where values for one or more attributes of a child data object are constrained by corresponding one or more attributes of a parent data object. The set of data objects and their relationships can be represented, such as in a graph. In an iterative process, the data object representation is analyzed to identify "leaf nodes," which are data objects that do not constrain other data objects. Relevant data is deleted from the data objects, and the representation is updated to "remove" such data objects so that a new set of leaf nodes is obtained. Optionally, when a leaf node that serves as a parent is analyzed, it can be confirmed whether corresponding data has already been deleted from its children.

20 Claims, 28 Drawing Sheets

| Table 1 104a | Table 2 104b | Table 3 104c |
|---|---|---|
| Attribute A <pk> 108a | Attribute A' <fk> 110a | Attribute D' <fk> 112a |
| Attribute B <pk> 108b | Attribute B' <fk> 110b | Attribute F <pk> 112b |
| Attribute C 108c | Attribute D <pk> 110c | Attribute G 112c |
| Timestamp 108d | Attribute E 110d | Timestamp 112d |
| | Timestamp 110e | |

| Table 4 104d | Table 5 104e | Table 6 104f |
|---|---|---|
| Attribute A' <fk> 114a | Attribute H <fk> 116a | Attribute F' <fk> 118a |
| Attribute B' <fk> 114b | Attribute J <pk> 116b | Attribute L <pk> 118b |
| Attribute F' <fk> 114c | Attribute K 116c | Attribute M 118c |
| Attribute H <pk> 114d | Timestamp 116d | Timestamp 118d |
| Attribute I 114e | | |
| Timestamp 114f | | |

Data Dictionary 122
  Data Object Metadata 124
    Table Definitions 126
      Name 128a
      Columns 128b
      Primary Key 128c
      Foreign Keys 128d

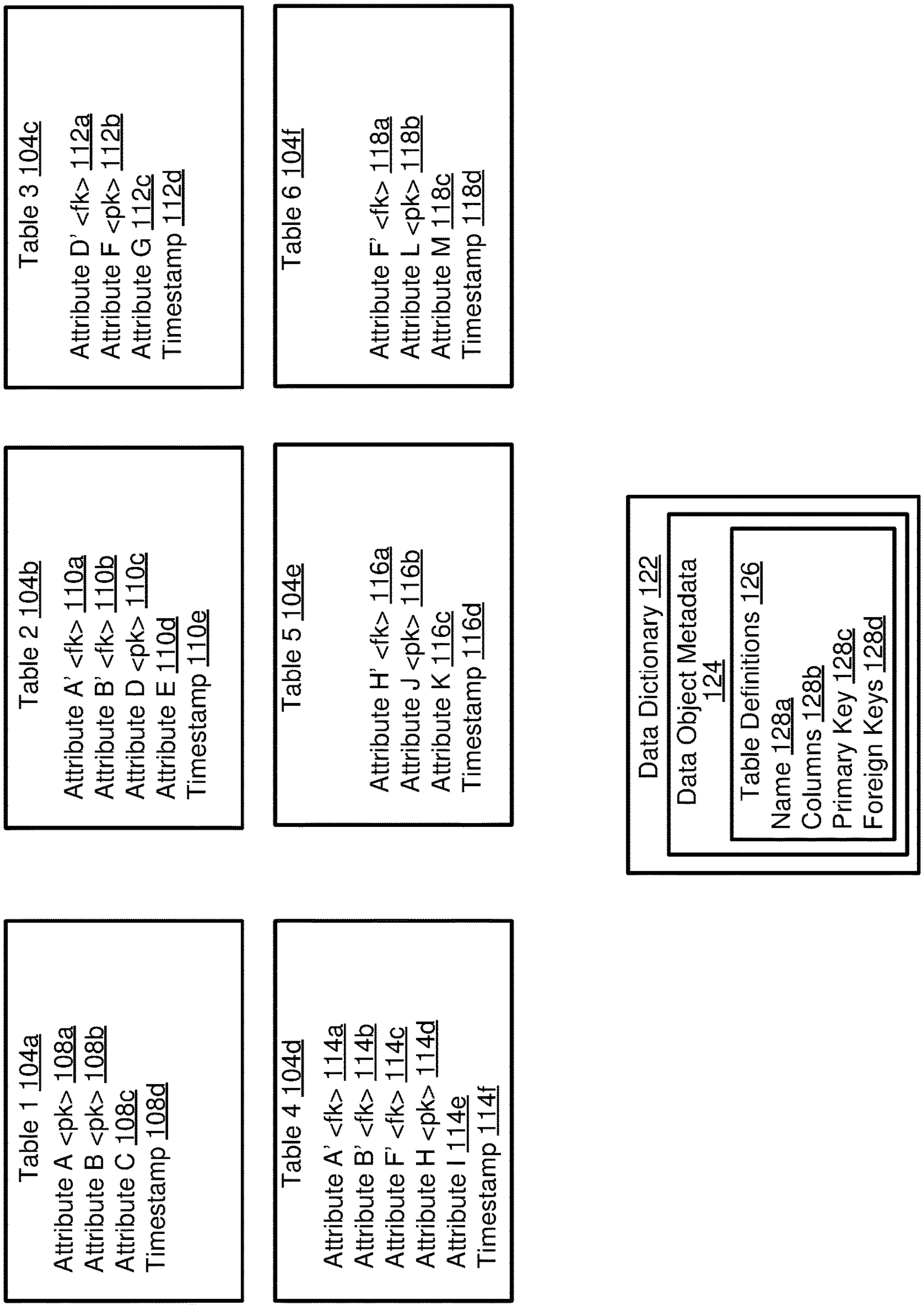

FIG. 1A

```
import networkx as nx
import matplotlib.pyplot as plt

# The data dictionary tables
table_dict = {'Table1': 'The first table', 'Table2': 'The second table'}

column_dict = [
    {'Table Name': 'Table1', 'Column Name': 'Id', 'Data Type': 'INT', 'Column Description': 'Identifier for Table1', 'Is Primary Key':
'Yes'},
    {'Table Name': 'Table2', 'Column Name': 'Id', 'Data Type': 'INT', 'Column Description': 'Identifier for Table2', 'Is Primary Key':
'Yes'},
    {'Table Name': 'Table2', 'Column Name': 'Table1Id', 'Data Type': 'INT', 'Column Description': 'Foreign key reference to Table1',
'Is Primary Key': 'No'},
]

foreign_key_dict = [
    {'Foreign Key Name': 'FK_Table1_Table2', 'Source Table': 'Table2', 'Source Column': 'Table1Id', 'Target Table': 'Table1',
'Target Column': 'Id'},
]

# Create the directed graph
G = nx.DiGraph()

# Add nodes to the graph from the table dictionary
for table in table_dict.keys():
    G.add_node(table)

# Add edges to the graph from the foreign key dictionary
for fk in foreign_key_dict:
    G.add_edge(fk['Source Table'], fk['Target Table'], name=fk['Foreign Key Name'])
```

FIG. 4A

```
# Here we define the nodes and edges based on previous foreign_key_dict and table_dict
nodes = list(table_dict.keys())
edges = [(fk['Source Table'], fk['Target Table'], {'name': fk['Foreign Key Name']}) for fk in foreign_key_dict]

# For nodes
print("Nodes:")
for node in nodes:
    print(f'- {node}')

# For edges
print("\nEdges:")
for edge in edges:
    source, target, attrs = edge
    print(f'- {source} -- {attrs["name"]} --> {target}')


Nodes:
- Table1
- Table2

Edges:
- Table2 -- FK_Table1_Table2 --> Table1
```

FIG. 4B

```
import networkx as nx

# The data dictionary tables
table_dict = {'Table1': 'The first table', 'Table2': 'The second table'}

foreign_key_dict = [
    {'Foreign Key Name': 'FK_Table1_Table2', 'Source Table': 'Table2', 'Source Column': 'Table1Id', 'Target Table': 'Table1', 'Target Column': 'Id'},
]

# Create the directed graph
G = nx.DiGraph()

# Add nodes to the graph from the table dictionary
for table in table_dict.keys():
    G.add_node(table)

# Add edges to the graph from the foreign key dictionary
for fk in foreign_key_dict:
    G.add_edge(fk['Source Table'], fk['Target Table'], name=fk['Foreign Key Name'])

# Convert directed graph to undirected graph for connected components
UG = G.to_undirected()

# Find and print connected components (i.e., sets of related tables)
for i, connected_tables in enumerate(nx.connected_components(UG), start=1):
    print(f"Set {i}: {', '.join(connected_tables)}")
```

```
Set 1: Table2, Table1
```

```
import networkx as nx

# Suppose you have more tables and relationships:
table_dict = {
    'Table1': 'The first table',
    'Table2': 'The second table',
    'Table3': 'The third table',
    'Table4': 'The fourth table',
    'Table5': 'The fifth table',
}

foreign_key_dict = [
    {'Foreign Key Name': 'FK_Table1_Table2', 'Source Table': 'Table2', 'Source Column': 'Table1Id', 'Target Table': 'Table1', 'Target Column': 'Id'},
    {'Foreign Key Name': 'FK_Table3_Table4', 'Source Table': 'Table4', 'Source Column': 'Table3Id', 'Target Table': 'Table3', 'Target Column': 'Id'},
]

# Create the directed graph
G = nx.DiGraph()

# Add nodes and edges as before
for table in table_dict.keys():
    G.add_node(table)

for fk in foreign_key_dict:
    G.add_edge(fk['Source Table'], fk['Target Table'], name=fk['Foreign Key Name'])

# Convert directed graph to undirected graph for connected components
UG = G.to_undirected()

# Find connected components (i.e., subsets of related tables)
connected_components = nx.connected_components(UG)

# Output each connected component as a subgraph
for i, component in enumerate(connected_components, start=1):
    # Extract subgraph
    subgraph = UG.subgraph(component)

    print(f"Subgraph {i}:")

    # Output nodes in this subgraph
    print("- Nodes:", subgraph.nodes)

    # Output edges in this subgraph
    print("- Edges:", subgraph.edges)
    print()
```

```
Subgraph 1:
- Nodes: ['Table1', 'Table2']
- Edges: [('Table1', 'Table2'), ('Table2', 'Table1')]

Subgraph 2:
- Nodes: ['Table3', 'Table4']
- Edges: [('Table3', 'Table4'), ('Table4', 'Table3')]

Subgraph 3:
- Nodes: ['Table5']
- Edges: []
```

FIG. 4D

```
CREATE TABLE IF NOT EXISTS public.resource
(
    id uuid NOT NULL DEFAULT uuid_generate_v4(),
    type text COLLATE pg_catalog."default" NOT NULL,
    tenant_id text COLLATE pg_catalog."default" NOT NULL,
    process_id text COLLATE pg_catalog."default" NOT NULL,
    tenant_name text COLLATE pg_catalog."default",
    "timestamp" timestamp without time zone DEFAULT now(),
    CONSTRAINT "RESOURCE_pkey" PRIMARY KEY (id)
)

TABLESPACE pg_default;
```

```
ALTER TABLE IF EXISTS public.resource
    OWNER to dbo;
-- Index: r_timestamp_tid_idx

-- DROP INDEX IF EXISTS public.r_timestamp_tid_idx;

CREATE INDEX IF NOT EXISTS r_timestamp_tid_idx
    ON public.resource USING btree
    ("timestamp" ASC NULLS LAST, tenant_id COLLATE pg_catalog."default" ASC NULLS LAST)
    TABLESPACE pg_default;
```

FIG. 8A

```
-- DROP TABLE IF EXISTS public.resource_consumer;

CREATE TABLE IF NOT EXISTS public.resource_consumer
(
    id uuid NOT NULL DEFAULT uuid_generate_v4(),
    context_id text COLLATE pg_catalog."default",
    tenant_id text COLLATE pg_catalog."default",
    subaccount_id text COLLATE pg_catalog."default",
    system_id text COLLATE pg_catalog."default",
    resource_id uuid,
    step_id text COLLATE pg_catalog."default",
    "timestamp" timestamp without time zone DEFAULT now(),
    CONSTRAINT "RESOURCE_CONSUMER_pkey" PRIMARY KEY (id),
    CONSTRAINT "fk_RESOURCE_CONSUMER_2_RESOURCE" FOREIGN KEY (resource_id)
        REFERENCES public.resource (id) MATCH SIMPLE
        ON UPDATE NO ACTION
        ON DELETE NO ACTION
)

TABLESPACE pg_default;
```

FIG. 8B

```
ALTER TABLE IF EXISTS public.resource_consumer
    OWNER to dbo;
-- Index: rc_rid_idx

-- DROP INDEX IF EXISTS public.rc_rid_idx;

CREATE INDEX IF NOT EXISTS rc_rid_idx
    ON public.resource_consumer USING btree
    (resource_id ASC NULLS LAST)
    TABLESPACE pg_default;
-- Index: rc_timestamp_tid_idx

-- DROP INDEX IF EXISTS public.rc_timestamp_tid_idx;

CREATE INDEX IF NOT EXISTS rc_timestamp_tid_idx
    ON public.resource_consumer USING btree
    ("timestamp" ASC NULLS LAST, tenant_id COLLATE pg_catalog."default" ASC NULLS LAST)
    TABLESPACE pg_default;
-- Index: resource_consumer_id

-- DROP INDEX IF EXISTS public.resource_consumer_id;

CREATE INDEX IF NOT EXISTS resource_consumer_id
    ON public.resource_consumer USING btree
    (id ASC NULLS LAST)
    TABLESPACE pg_default;
```

FIG. 8C

```
-- DROP TABLE IF EXISTS public.resource_usage;

CREATE TABLE IF NOT EXISTS public.resource_usage
(
    id uuid NOT NULL DEFAULT uuid_generate_v4(),
    tenant_id text COLLATE pg_catalog."default" NOT NULL,
    "timestamp" timestamp without time zone DEFAULT now(),
    usage_value bigint,
    resource_consumer_id uuid NOT NULL,
    type text COLLATE pg_catalog."default",
    total_available bigint,
    mpl_id text COLLATE pg_catalog."default",
    CONSTRAINT "RESOURCE_USAGE_pkey" PRIMARY KEY (id, tenant_id),
    CONSTRAINT "fk_RESOURCE_USAGE_RESOURCE_CONSUMER" FOREIGN KEY (resource_consumer_id)
        REFERENCES public.resource_consumer (id) MATCH SIMPLE
        ON UPDATE NO ACTION
        ON DELETE NO ACTION
) PARTITION BY LIST (tenant_id);

ALTER TABLE IF EXISTS public.resource_usage
    OWNER to dbo;
-- Index: ru_rc_idx

-- DROP INDEX IF EXISTS public.ru_rc_idx;

CREATE INDEX IF NOT EXISTS ru_rc_idx
    ON public.resource_usage USING btree
    (resource_consumer_id ASC NULLS LAST);
-- Index: timestamp_type_idx

-- DROP INDEX IF EXISTS public.timestamp_type_idx;

CREATE INDEX IF NOT EXISTS timestamp_type_idx
    ON public.resource_usage USING btree
    ("timestamp" ASC NULLS LAST, type COLLATE pg_catalog."default" ASC NULLS LAST);

-- Partitions SQL
```

FIG. 8D

```
CREATE TABLE public.resource_usage_008adbee_1977_412c_9084_d35fa8acbab8 PARTITION OF public.resource_usage
    FOR VALUES IN ('008adbee-1977-412c-9084-d35fa8acbab8')
TABLESPACE pg_default;

ALTER TABLE IF EXISTS public.resource_usage_008adbee_1977_412c_9084_d35fa8acbab8
    OWNER to dbo;
CREATE TABLE public.resource_usage_010d6079_2c0c_4ef0_ab9a_e45a7f96cfe9 PARTITION OF public.resource_usage
    FOR VALUES IN ('010d6079-2c0c-4ef0-ab9a-e45a7f96cfe9')
TABLESPACE pg_default;

ALTER TABLE IF EXISTS public.resource_usage_010d6079_2c0c_4ef0_ab9a_e45a7f96cfe9
    OWNER to dbo;
CREATE TABLE public.resource_usage_017de352_5716_4483_bf17_1106d009f0b7 PARTITION OF public.resource_usage
    FOR VALUES IN ('017de352-5716-4483-bf17-1106d009f0b7')
TABLESPACE pg_default;

ALTER TABLE IF EXISTS public.resource_usage_017de352_5716_4483_bf17_1106d009f0b7
    OWNER to dbo;
CREATE TABLE public.resource_usage_026bb7c4_d0cf_495a_a7f2_a9757bfbf8d8 PARTITION OF public.resource_usage
    FOR VALUES IN ('026bb7c4-d0cf-495a-a7f2-a9757bfbf8d8')
TABLESPACE pg_default;
```

```
@Test
public void testDeleteObsoleteResourceUsage() {
   ResourceUsagePayload payload = ResourceUsageRepoTest.createResourceUsagePayload();
   resourceUsageRepo.persistResourceUsage(payload);
   template.execute("SELECT count(*) from RESOURCE_USAGE");
   assertEquals(EXPECTED_RESOURCES, template.queryForObject("SELECT count(*) from RESOURCE", Integer.class));
   assertEquals(EXPECTED_CONSUMERS, template.queryForObject("SELECT count(*) from RESOURCE_CONSUMER",
Integer.class));
   assertEquals(EXPECTED_RESOURCE_USAGE_COUNT, template.queryForObject("SELECT count(*) from RESOURCE_USAGE",
Integer.class));
   config.setFixedCleanupRateMs(111111111111111110L);
   config.setDataRetentionDays(0);
   config.setInitialCleanupDelayMs(999999999999999L);
   cleanupService.cleanupResourceUsageData();
   assertEquals(0, template.queryForObject("SELECT count(*) from RESOURCE", Integer.class));
   assertEquals(0, template.queryForObject("SELECT count(*) from RESOURCE_CONSUMER", Integer.class));
   assertEquals(0, template.queryForObject("SELECT count(*) from RESOURCE_USAGE", Integer.class));
}
```

```
DELETE FROM RESOURCE_USAGE
    WHERE TENANT_ID = 123 AND
    TIMESTAMP < 2023-06-07 17:26:35.688
```

912

920

```
DELETE FROM RESOURCE_CONSUMER
    WHERE NOT EXISTS (SELECT ID FROM RESOURCE_USAGE
        WHERE TENANT_ID = 123 AND
        TIMESTAMP < 2023-06-07 17:26:35.688 LIMIT 1)
    AND ID IN (SELECT ID FROM RESOURCE_CONSUMER
        WHERE TIMESTAMP < 2023-06-07 17:26:35.688 AND
        TENANT_ID = 123
        ORDER BY TIMESTAMP ASC LIMIT 50)
```

914

924

```
DELETE FROM RESOURCE
    WHERE NOT EXISTS (SELECT ID FROM RESOURCE_CONSUMER
        WHERE TENANT_ID = 123 AND
        TIMESTAMP < 2023-06-07 17:26:35.688 LIMIT 1)
    AND ID IN (SELECT ID FROM RESOURCE
        WHERE TIMESTAMP < 2023-06-07 17:26:35.688 AND
        TENANT_ID = 123 ORDER BY TIMESTAMP ASC LIMIT 50)
```

```
@Transactional
public int deleteObsoleteResourceUsage(String tenantId, int retentionDays) {
        try {
                return jdbcTemplate.update("DELETE FROM RESOURCE_USAGE WHERE TENANT_ID = ? AND
                TIMESTAMP < ?", ps -> {
                ps.setQueryTimeout((int) TimeUnit.MINUTES.toSeconds(CLEANUP_QUERY_TIMEOUT_MINUTES));
                ps.setObject(1, tenantId);
                ps.setObject(2, new java.sql.Timestamp(Instant.now().toEpochMilli() -
                TimeUnit.DAYS.toMillis(retentionDays)));
                });
                } catch (Exception e) {
                        throw new ResourceUsageException("Unable to delete obsolete RESOURCE_USAGE data for
                tenant: " + tenantId, e);
        }
}
```

934

```
public int deleteObsoleteResource(String tenantId, int retentionDays) {
        return deleteObsoleteDataBasedOnTimestamp(tenantId, TableNames.RESOURCE,
        TableNames.RESOURCE_CONSUMER, retentionDays);
```

```
public int deleteObsoleteDataBasedOnTimestamp(String tenantId, TableNames tableName, TableNames predecessorTable, int retentionDays) {
        String deletionSql = ("DELETE FROM table WHERE NOT EXISTS" +
        "(SELECT ID FROM predecessor_t WHERE TENANT_ID = ? AND TIMESTAMP < ? LIMIT 1) " +
        "AND ID IN (SELECT ID FROM table WHERE TIMESTAMP < ? AND TENANT_ID = ? ORDER BY TIMESTAMP ASC LIMIT 50)")
        .replace("table", tableName.name()).replace("predecessor_t", predecessorTable.name());
        int totalDeleted = 0;
        try {
        int deleted = -1;
        Timestamp deletionTimestamp = new java.sql.Timestamp(Instant.now().toEpochMilli() - TimeUnit.DAYS.toMillis(retentionDays));
        while (deleted != 0) {
        deleted = deleteRecords(tenantId, deletionSql, deletionTimestamp);
        totalDeleted += deleted;
        }
        return totalDeleted;
        } catch (DataIntegrityViolationException e) {
        logger.warn("Encountered current data in predecessor table: {}, All obsolete data deleted in table: {}", predecessorTable.name(), tableName);
        return totalDeleted;
        } catch (Exception e) {
        throw new DbEntityException(String.format("Unable to delete obsolete data %s", tableName), e);
}
```

```
@Transactional(propagation = Propagation.REQUIRES_NEW)
public int deleteRecords(String tenantId, String deletionSql, Timestamp deletionTimestamp) {
        return jdbcTemplate.update(deletionSql, ps -> {
        logger.debug("DELETION SQL: {}, tenantId: {}, deletionTimestamp: {}", deletionSql, tenantId,
        deletionTimestamp);
        ps.setQueryTimeout((int)
        TimeUnit.MINUTES.toSeconds(CLEANUP_QUERY_TIMEOUT_MINUTES));
        ps.setObject(1, tenantId);
        ps.setObject(2, deletionTimestamp);
        ps.setObject(3, deletionTimestamp);
        ps.setObject(4, tenantId);
});
}
```

946

```
@ManagedOperation
public void cleanupTenantData(String tenantId) {
  int obsoleteRuCount = repo.deleteObsoleteResourceUsage(tenantId, config.getDataRetentionDays());
 LOG.debug("Finished deleting obsolete resource_usage records: {}", obsoleteRuCount);
 int obsoleteRcCount = repo.deleteObsoleteResourceConsumer(tenantId, config.getDataRetentionDays());
 LOG.debug("Finished deleting obsolete resource_consumer records: {}", obsoleteRcCount);
 int obsoleteResourceCount = repo.deleteObsoleteResource(tenantId, config.getDataRetentionDays());
 LOG.debug("Finished deleting obsolete resource records: {}", obsoleteResourceCount);
}
```

```
public void testDeleteObsoleteResourceUsage() {
   ResourceUsagePayload payload = ResourceUsageRepoTest.createResourceUsagePayload();
   resourceUsageRepo.persistResourceUsage(payload);
   template.execute("SELECT count(*) from RESOURCE_USAGE");
   assertEquals(EXPECTED_RESOURCES, template.queryForObject("SELECT count(*) from RESOURCE", Integer.class));
   assertEquals(EXPECTED_CONSUMERS, template.queryForObject("SELECT count(*) from RESOURCE_CONSUMER", Integer.class));
   assertEquals(EXPECTED_RESOURCE_USAGE_COUNT, template.queryForObject("SELECT count(*) from RESOURCE_USAGE",
Integer.class));
   config.setFixedCleanupRateMs(111111111111111110L);
   config.setDataRetentionDays(0);
   config.setInitialCleanupDelayMs(999999999999999L);
   cleanupService.cleanupDataAllTenants();
   assertEquals(0, template.queryForObject("SELECT count(*) from RESOURCE", Integer.class));
   assertEquals(0, template.queryForObject("SELECT count(*) from RESOURCE_CONSUMER", Integer.class));
   assertEquals(0, template.queryForObject("SELECT count(*) from RESOURCE_USAGE", Integer.class));
}
```

```
DELETE FROM RESOURCE_USAGE
        WHERE TENANT_ID = 123 AND
        TIMESTAMP < 2023-06-07 17:26:35.688
```

962

970

```
DELETE FROM RESOURCE_CONSUMER
     WHERE ID IN
     (SELECT DISTINCT t.ID FROM RESOURCE_CONSUMER t
     LEFT JOIN RESOURCE_USAGE
     dependent ON dependent.RESOURCE_CONSUMER_ID = t.ID AND
     dependent.TENANT_ID = t.TENANT_ID
     WHERE t.TENANT_ID = 123 AND
     t.TIMESTAMP < 2023-06-07 17:26:35.688 AND
     dependent.ID is NULL LIMIT 50)
```

964

970

```
DELETE FROM RESOURCE
    WHERE ID IN
    (SELECT DISTINCT t.ID FROM RESOURCE t
    LEFT JOIN RESOURCE_CONSUMER
    dependent ON dependent.RESOURCE_ID = t.ID AND
    dependent.TENANT_ID = t.TENANT_ID
    WHERE t.TENANT_ID = 123 AND
    t.TIMESTAMP < 2023-06-07 17:26:35.688 AND
    dependent.ID is NULL LIMIT 50)
```

FIG. 9G

```
@Transactional
public int deleteResourceUsage(String tenantId, int retentionDays) {
   try {
      return jdbcTemplate.update("DELETE FROM RESOURCE_USAGE WHERE TENANT_ID = ? AND ID IN " +
            "(SELECT ID FROM RESOURCE_USAGE WHERE TENANT_ID = ? AND TIMESTAMP < ? ORDER BY
TIMESTAMP ASC LIMIT 100)", ps -> {
         ps.setQueryTimeout(cleanupQueryTimeoutSeconds());
         ps.setObject(1, tenantId); //needed to tell the query optimizer to hit only a particular partition
         ps.setObject(2, tenantId);
         ps.setObject(3, getCleanupTimestamp(retentionDays));
      });
   } catch (Exception e) {
      throw new ResourceUsageException("Unable to delete obsolete RESOURCE_USAGE data for tenant: " +
tenantId, e);
   }
}


@Transactional
public int deleteResource(String tenantId, int retentionDays) {
   return delete(tenantId, TableNames.RESOURCE, TableNames.RESOURCE_CONSUMER, retentionDays);
}


@Transactional
public int deleteResourceConsumer(String tenantId, int retentionDays) {
   return delete(tenantId, TableNames.RESOURCE_CONSUMER, TableNames.RESOURCE_USAGE,
retentionDays);
}


protected int delete(String tenantId, TableNames tableName, TableNames predecessorTable, int retentionDays) {
   String deletionSql = ("DELETE FROM {{TABLE}} where ID IN " + //
         "(SELECT DISTINCT t.ID FROM {{TABLE}} t LEFT JOIN {{PREDECESSOR_TABLE}} dependent ON " + //
         "dependent.{{TABLE}}_ID = t.ID AND " +//
         "dependent.TENANT_ID = t.TENANT_ID " +//
         "WHERE t.TENANT_ID = ? AND t.TIMESTAMP < ? " +//
         "AND dependent.ID is NULL LIMIT 50)")//
         .replace("{{TABLE}}", tableName.name()).replace("{{PREDECESSOR_TABLE}}", predecessorTable.name());
   try {
      Timestamp deletionTimestamp = getCleanupTimestamp(retentionDays);
      return jdbcTemplate.update(deletionSql, ps -> {
         logger.debug("Executing cleanup SQL: {}, tenantId: {}, deletionTimestamp: {}", deletionSql, tenantId,
deletionTimestamp);
         ps.setQueryTimeout(cleanupQueryTimeoutSeconds());
         ps.setObject(1, tenantId);
         ps.setObject(2, deletionTimestamp);
      });
   } catch (DataIntegrityViolationException e) {
      logger.warn("Encountered current data in predecessor table: {}, All obsolete data deleted in table: {}",
predecessorTable.name(), tableName);
      return 0;
   } catch (Exception e) {
      throw new DbEntityException(String.format("Unable to delete obsolete data %s", tableName), e);
   }
}
```

FIG. 9H

```
public void cleanupDataAllTenants() {
   if (Utils.shouldRunOnThisInstance(config)) {
      try {
         LOG.info("Cleaning up obsolete resource usage data - initialDelay:{}, fixedRate:{},
dataRetentionDays:{}", //
               config.getInitialCleanupDelayMs(), config.getFixedCleanupRateMs(),
config.getDataRetentionDays());
         List<String> tenants = template.queryForList("select distinct TENANT_ID from RESOURCE",
String.class);
         long startTime = Instant.now().toEpochMilli();
         for (String tenantId : tenants) {
            long begin = Instant.now().toEpochMilli();
            cleanupTenantData(tenantId);
            LOG.debug("Finished cleaning up obsolete data for tenant: {}, took: {}", tenantId,
(Instant.now().toEpochMilli() - begin) / 1000.0);
         }
         LOG.info("Finished cleaning up obsolete data, took: {}", (Instant.now().toEpochMilli() -
startTime) / 1000.0);

      } catch (Exception e) {
         LOG.error("Unable to delete resource usage, resource consumer, resource data", e);
      }
   } else {
      LOG.warn("Resource usage data clean up job disabled on this instance");
   }
}


public void cleanupTenantData(String tenantId) {
   deleteInSmallTransactions(() ->  repo.deleteResourceUsage(tenantId,
config.getDataRetentionDays()));
   deleteInSmallTransactions(() ->  repo.deleteResourceConsumer(tenantId,
config.getDataRetentionDays()));
   deleteInSmallTransactions(() ->  repo.deleteResource(tenantId, config.getDataRetentionDays()));
   LOG.info("Deleted obsolete resource usage data  for tenant {}", tenantId);
}

public void deleteInSmallTransactions(Supplier<Integer> deleteInANewTransaction) {
   long totalDeletedRecords = 0;
   try {
      int deletedRecords;
      do {
         deletedRecords = deleteInANewTransaction.get();
         LOG.debug("Deleted {} resource data usage records", deletedRecords);
         totalDeletedRecords += deletedRecords;
      } while (deletedRecords > 0);
   } catch (ResourceUsageException e) {
      LOG.error("Unable to delete data", e);
   }
   LOG.info("Deleted a total of {} resource data records", totalDeletedRecords);
}
```

FIG. 9I

TIMESTAMP-BASED DELETIONS FOR INTERDEPENDENT DATA OBJECTS

FIELD

The present disclosure generally relates to deleting data in sets of interdependent data objects.

BACKGROUND

Modern database systems are often tasked with processing huge amounts of data. For example, enterprise level database systems commonly have tables with hundreds of individual fields and often millions of rows, or more. Database systems are complex not just because of the number of tables and the number of records held, but also because of relationships that exist between the tables. For example, the concept of a "primary key" is well known in the database arts as a primary identifier that uniquely identifies a particular record of a particular table. Tables with related data often have a relationship where a primary key in one table is also used in another table, where it is referred to as a "foreign key."

Database systems typically include functionality to facilitate the creation and use of foreign keys, including functionality where values of the primary key in a first table serve as referential constraints on a second table that includes the primary key fields as a foreign key field. For example, the foreign key relationship can be expressly declared when the second table is created.

Foreign key values serve as an important link between tables in a relational database. These values enforce referential integrity by ensuring that each value in the foreign key column corresponds to an existing value in the primary key column of the referenced table. This means that a foreign key value is considered valid only if it matches a primary key value in the referenced table.

In addition to these explicit foreign key relationships, there can be implied foreign key relationships between tables. These can be based on common naming conventions or shared data. For example, when columns with the same names are used in different tables, or when a column serving as a primary key in one table appears in another table, it might suggest a logical connection between those tables, and at least in some cases a database system can use this information to define a foreign key relationship.

Referential constraints, including foreign key relationships, can result from database design principles. For example, traditional row-store databases are often designed using well known principles of data normalization, where a group of related attributes can be analyzed to result in the creation of multiple tables to store the attributes, rather than all attributes being stored in a single table. Foreign key relationships can be created as a result of these normalization rules, either automatically or manually. However, foreign key relationships can be created based on other considerations, such as to deliberately create referential constraints for data consistency and integrity, to assist in query optimization (such as guiding a query optimizer in decisions regarding JOIN operations or the use of indexes), for assisting in an understanding of semantic relationships between data, or for access control purposes (such as having a table with permissions information be related to a table that stores other data).

While referential constraints, including foreign key relationships, can be beneficial, the constraints must typically be respected when values of the constraining attributes are altered or deleted. For example, assume employee data is maintained in two tables. One table holds information about particular departments to which an employee may be assigned, and may have a "department id" as its primary key. Another table may include information for particular employees, such as an employee identifier, an employee name, and a job title. This table may also include the department id attribute, used as a foreign key referring the primary key attribute in the "departments" table.

Assume that a department, "department 1" is created, and then a number of employee records are created for employees assigned to department 1. Since department 1 exists in the department table, no referential constraints are violated when the employee records are created. However, now consider that department 1 is removed from the department table. Referential integrity is violated because there are still employees assigned to department 1, but department 1 no longer exists as a primary key value.

Various ways of addressing this problem have been developed. In some cases, custom algorithms are created for specific schemas/deletion scenarios. Another technique is referred to as a "cascading delete." In a cascading delete, a request to delete a root record, having a value for its primary key, is propagated so as to also delete tables having a foreign key relationship with that primary key. There approaches can suffer from various disadvantages, including performance overhead resulting from excessive locking, or performance overhead for cascading deletes, including because deletion of records for multiple tables is typically carried out in a single database transaction. Attempts to address these issues can require the development of custom code for specific scenarios, which can involve significant time and effort developing solutions for particular use cases. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for identifying sets of related data, such as for a data deletion process. Data objects can be considered as having parent-child relationships, where values for one or more attributes of a child data object are constrained by corresponding one or more attributes of a parent data object. The set of data objects and their relationships can be represented, such as in a graph. In an iterative process, the data object representation is analyzed to identify "leaf nodes," which are data objects that do not constrain other data objects. Relevant data is deleted from the data objects, and the representation is updated to "remove" such data objects so that a new set of leaf nodes is obtained. Optionally, when a leaf node that serves as a parent is analyzed, it can be confirmed whether corresponding data has already been deleted from its children.

In one aspect, the present disclosure provides a data deletion process for a set of related data objects. A first set comprising a plurality of data objects is received. At least a portion of data objects of the plurality of data objects have a dependency on one or more other data objects of the plurality of data objects or are the subject of such a dependency. A dependency between two data objects of the plurality of the data objects is defined by one or more attributes of a first data object of the two data objects that refer to a corresponding one or more attributes of a second data object of the two data objects. A dependency between two data objects has a direction such that the one or more attributes of the first data object are target attributes, the one or more attributes of the second data object are source attributes, and the target attributes point to the source attributes. At least a portion of data objects of the plurality of data objects include a timestamp attribute.

In an iterative process starting from a second set of data objects comprising the at least a portion of the data objects, one of more leaf nodes in the second set of data objects are identified. A leaf node corresponds to a data object of the second set of data objects that does not referentially constrain another data object of the second set of data objects. For identified one or more leaf nodes, commands are generated to delete data that satisfies query criteria, the query criteria including the timestamp attributes of the one or more leaf nodes. Data objects corresponding to the one or more leaf nodes are at least temporality removed from the second set of data objects. It is determined whether the second set of data objects includes additional data objects. When the second set of data objects includes additional data objects, another iteration of the iterative process is performed. When the second set of data objects does not include additional data objects, another iteration of the iterative process is not performed.

The present disclosure also includes computing systems and tangible, non-transitory computer-readable storage media configured to carry out, or includes instructions for carrying out an above-described method. As described herein, a variety of other features and advantages can be incorporated into the technologies as desired.

BRIEF DESCRIPTION OF THE DRAWINGS

FIG. 1A is a diagram illustrating an example set of database tables used in describing techniques of the present disclosure, as well as illustrating how definitional information for such tables can be maintained in a data dictionary.

FIG. 4A-4D provide example code that can be used for generating a graph useable in the process of FIG. 3.

FIGS. 8A-8D provide example commands for creating the tables of FIG. 7, and indexes associated with such tables, while FIG. 8E provides example commands for providing data for such tables.

FIGS. 9A-9I provide example code for processing deletions for data stored in instances of the tables of FIG. 7.

DETAILED DESCRIPTION

Example 1—Overview

Figure 1B:
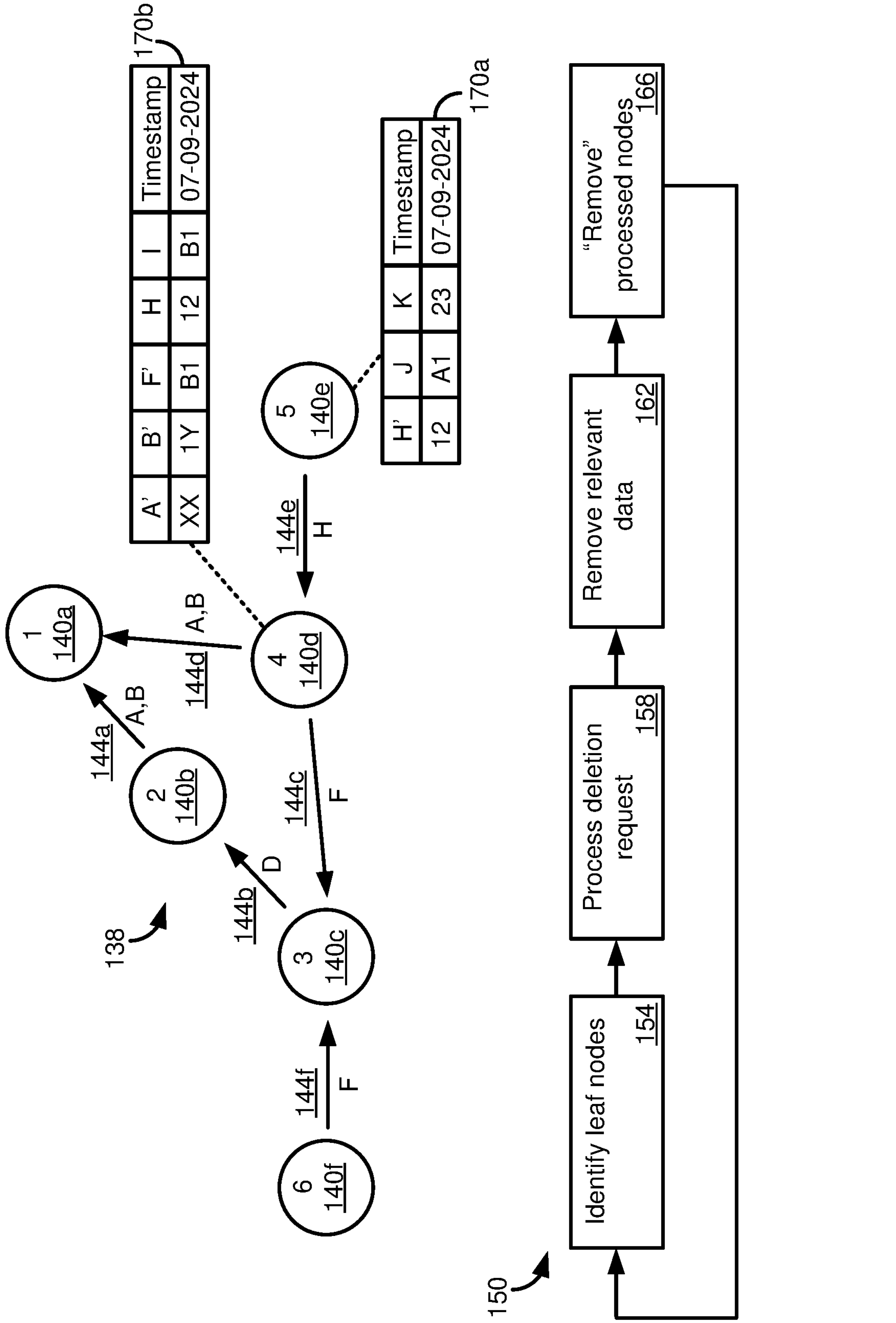
FIG. 1B illustrates how the tables of FIG. 1A, and relationships between such tables, can be represented as a graph, as well as a process according to the present disclosure of how such a graph can be used to process deletion requests.

Modern database systems are often tasked with processing huge amounts of data. For example, enterprise level database systems commonly have tables with hundreds of individual fields and often millions of rows, or more. Database systems are complex not just because of the number of tables and the number of records held, but also because of relationships that exist between the tables. For example, the concept of a "primary key" is well known in the database arts as a primary identifier that uniquely identifies a particular record of a particular table. Tables with related data often have a relationship where a primary key in one table is also used in another table, where it is referred to as a "foreign key."

Database systems typically include functionality to facilitate the creation and use of foreign keys, including functionality where values of the primary key in a first table serve as referential constraints on a second table that includes the primary key fields as a foreign key field. For example, the foreign key relationship can be expressly declared when the second table is created.

Foreign key values serve as an important link between tables in a relational database. These values enforce referential integrity by ensuring that each value in the foreign key column corresponds to an existing value in the primary key column of the referenced table. This means that a foreign key value is considered valid only if it matches a primary key value in the referenced table.

In addition to these explicit foreign key relationships, there can be implied foreign key relationships between tables. These can be based on common naming conventions or shared data. For example, when columns with the same names are used in different tables, or when a column serving as a primary key in one table appears in another table, it might suggest a logical connection between those tables, and at least in some cases a database system can use this information to define a foreign key relationship.

Referential constraints, including foreign key relationships, can result from database design principles. For example, traditional row-store databases are often designed using well known principles of data normalization, where a group of related attributes can be analyzed to result in the creation of multiple tables to store the attributes, rather than all attributes being stored in a single table. Foreign key relationships can be created as a result of these normalization rules, either automatically or manually. However, foreign key relationships can be created based on other considerations, such as to deliberately create referential constraints for data consistency and integrity, to assist in query optimization (such as guiding a query optimizer in decisions regarding JOIN operations or the use of indexes), for assisting in an understanding of semantic relationships between data, or for access control purposes (such as having a table with permissions information be related to a table that stores other data).

While referential constraints, including foreign key relationships can be beneficial, the constraints must typically be respected when values of the constraining attributes are altered or deleted. For example, assume employee data is maintained in two tables. One table holds information about particular departments to which an employee may be assigned, and may have a "department id" as its primary key. Another table may include information for particular employees, such as an employee identifier, an employee name, and a job title. This table may also include the department id attribute, used as a foreign key referring to the primary key attribute in the "departments" table.

Assume that a department, "department 1" is created, and then a number of employee records are created for employees assigned to department 1. Since department 1 exists in the department table, no referential constraints are violated when the employee records are created. However, now consider that department 1 is removed from the department table. Referential integrity is violated because there are still employees assigned to department 1, but department 1 no longer exists as a primary key value.

Other use cases can be even more challenging. For example, many use cases involve "ephemeral data." "Ephemeral data" refers to data that is stored/created for a comparatively short time period, and is often frequently deleted. Examples of ephemeral data can include logging activities for various application/system processes, or data representing current/recent state information, such as temperature measurements associated with a particular environment. If only recent data is of particular interest, it is typically desirable to delete the data when its relevant use period has expired.

Various ways of addressing this problem have been developed. In some cases, custom algorithms are created for specific schemas/deletion scenarios. Another technique is referred to as a "cascading delete." In a cascading delete, a request to delete a root record, having a value for its primary key, is propagated so as to also delete tables having a foreign key relationship with that primary key. These approaches can suffer from various disadvantages, including performance overhead resulting from excessive locking, or performance overhead for cascading deletes, including because deletion of records for multiple tables is typically carried out in a single database transaction. In addition, not all database systems support cascading deletes. Attempts to address these issues can require the development of custom code for specific scenarios, which can involve significant time and effort developing solutions for particular use cases. Accordingly, room for improvement exists.

As for performance overhead and concerns for cascading deletes, one issue that can arise results from table locking. That is, assume a query is received that results in the deletion of multiple primary key values. Typically, the database tables involved in the deletion would be "locked" during a transaction for the query. Locking the tables can prevent other queries/processes from accessing the tables, which can cause them to be delayed or to fail. In a production environment, failed or significantly delayed query execution can be of major concern. In addition, if tables involved in the cascading delete are interdependent, deadlocks can arise.

Other performance issues that can arise with cascading deletes include increased database input/output operations and transaction log growth, both of which can affect disk performance, storage space requirements, and processing time/throughput. The complexity of cascading deletes can also cause a query optimizer to generate suboptimal query execution plans. In addition, if table relationships are not appropriately defined and maintained, it is possible that a deletion that occurs as part of a cascading delete will unintentionally trigger additional cascading deletions.

The present disclosure provides techniques that can address these shortcomings. In one aspect, the present disclosure provides for a deletion technique that is generally applicable to a set of data objects having referential constraints. That is, rather than custom logic being needed for a particular set of data objects, a deletion process can be automatically defined. For example, metadata of the data objects can be analyzed to determine one or more subsets of the data objects that are related by referential constraints, and identify the associated data object relationships.

Deletion processes for the subsets of data objects can then be automatically defined. Deletion processes according to the present disclosure can be beneficial as they do not rely on cascading deletes. In particular, rather than starting from a "root" data object, such as a data object having a primary key that serves as the basis for a referential constraint, and identifying all related records to related tables in a single transaction, disclosed techniques interactively work "inwardly" from leaf data objects. As explained further below, leaf data objects can be child data objects (such as having one or more foreign key attributes) that are subject to constraints of parent data objects (such as attributes that serve as primary key attributes, and with respect to which the foreign key attributes are defined).

The disclosed deletion processes are advantageous, as they can delete data in "chunks" during execution of the process, as opposed to cascading deletions, which typically wait until the end of a long-running transaction before data is deleted. Deleting data in chunks can thus help reduce the duration for which table locks need to be held. In addition, at least certain deletion operations can be performed in parallel, speeding up an overall deletion process.

Although particular examples describe disclosed techniques being used with relational database tables, the techniques can be applied to other types of data objects, including data objects for unstructured or semi-structured data, or for objects in a virtual data model. In particular, disclosed techniques can find use when information about the definitional information of data objects is available, including dependency information (particularly, directed dependency information, such as parent-child relationships or foreign key relationships) and the data objects include a timestamp attribute.

Example 2—Example Overview of Process of Deleting Records from Sets of Interdependent Data Objects FIGS. 1A and 1B provide a general overview of disclosed techniques, including analyzing relationships between data objects, generating a representation of data objects that can be used during deletion operations, and an overall deletion process.

FIG. 1A illustrates a plurality of data objects 104, shown as data objects 104*a*-104*f*. In this case, the data objects 104 represent database tables, such as in a relational database management system. In a particular example, the database system can be the HANA database system of SAP SE, of Walldorf, Germany.

Database object 104*a* has a compound primary key formed from attributes 108*a* and 108*b*. The database object

104*a* includes two additional attributes 108*c*, 108*d* that are not part of the primary key. In particular, note that attribute 108*d* is a timestamp attribute.

Typically, a timestamp attribute refers to a time and date a particular record was created, or a particular time and date associated with the record, even if does not correspond to a time the record was created in a database system. For example, data can be processed for entry in a database system, and may have a date that has some semantic relationship with the data, such as a date a particular employee was hired or the date and time of a particular sales order. A date of creation of a corresponding database entry can be later than this "semantic date," and in some cases "technical" dates associated with database processes can be out of order compared with the semantic dates.

Disclosed techniques are generally described as operating on records using timestamp information, such as that maintained in the attribute 108*d*. However, in other implementations, disclosed techniques can be used more generally with ordering information, which may or may not correspond to a timestamp, but which can serve as a basis for determining when records should be deleted, as will be further described. Also, note that timestamp information can, but need not be, maintained in a time/date format. For example, disclosed techniques can be used with ordering information in the form of monotonically increasing integer values that represent increasingly recent points in time (that is, typically larger numbers are associated with more recent data/activity than smaller numbers).

Data object 104*b* includes a single primary key attribute 110*c*, where attributes 110*a* and 110*b* correspond to the primary key attributes 108*a* and 108*b* of the data object 104*a*, and thus having a foreign key relationship with such attributes. As discussed, a consequence of this relationship is that the foreign key relationship serves as a referential constraint, where values of the pair of attributes 110*a*, 110*b* are valid if those values are present as primary key values in the data object 104*a* for the attributes 108*a* and 108*b*. The data object 104*b* also includes attributes 110*d*, 110*e*, where attribute 110*e* is a timestamp attribute, such as described for the timestamp attribute 108*d*. Typically, to support comparisons between timestamp values, timestamp attributes (or at least one timestamp attribute) of the data objects 104*a*-104*f* are of the same type.

Data object 104*c* includes a single primary key attribute 112*b*, and includes an attribute 112*a* that serves as a foreign key to the data object 104*b*. The data object 104*c* is not directly related to the data object 104*a*, but is indirectly related through the data object 104*b*. The data object 104*c* includes an additional attribute 112*c*, as well as a timestamp attribute 112*d*.

Data object 104*d* includes a primary key attribute 114*d*, and is related to the data object 104*c* through foreign key attribute 114*c*, and to the data object 104*a* through foreign key attributes 114*a* and 114*b*. Data object 104*d* includes an additional attribute 114*e* and a timestamp attribute 114*f*.

Data object 104*e* includes a primary key attribute 116*b*, and has a relationship to data object 104*d* through foreign key attribute 116*a*. The data object 104*e* also includes an attribute 116*c* and a timestamp attribute 116*d*.

Finally, data object 104*f* includes a primary key attribute 118*b*, and is related to data object 104*c* through foreign key attribute 118*a*. Data object 104*f* includes an additional attribute 118*c* and a timestamp attribute 118*d*.

Information about data objects in a repository, referred to as data object metadata (providing data object definitional information, as opposed to data that is stored in instances of a data object) can be maintained in a data dictionary 122, which can also be referred to as a database catalog or, more generally, a metadata repository. The data dictionary 122 is shown as including data object metadata 124. In the case where data objects used in disclosed techniques are relational database tables, the data object metadata 124 corresponds to table definitional information as described above.

Table definitions 126 are shown as including attributes such as a table name 128*a*, columns 128*b* in given tables, primary keys 128*c* defined for given tables, and any defined foreign keys 128*d*. The table definitions 128, or data object metadata 124, can optionally include additional information.

The data objects 104 and their relationships are represented as an acyclic graph 138 in FIG. 1B. Nodes 140 (shown as nodes 140*a*-140*f*, corresponding respectively to data objects 104*a*-104*f*) of the graph 138, corresponding to vertices of the graph, represent the data objects 104, while edges 144 of the graph represent relationships between the data objects. In particular, the edges 144 represent referential constraints, more particularly the foreign key relationships described above for the data objects 104, where the attributes of the data objects and identifiers for the data object serve as metadata for the data objects. For an edge 144 connecting two nodes 140, the node by the tail of the arrow corresponds to a child node, such as a table having a foreign key constrained by a primary key of a parent node/table, located at the head of the arrow.

FIG. 1B also illustrates an algorithm 150 that is used in processing the graph 138, such as in deleting related records, and more particularly when records are deleted based on date criteria using timestamp attributes associated with the data objects 104*a*-104*f*. The algorithm 150 includes operations 154-166. For a provided graph, such as the graph 138, or analogous information (such as information regarding data objects 104 and relationships between data objects, corresponding to the edges 144), leaf nodes in graph are identified at 154. As used herein, a "leaf node" is a node that has no incoming edges. That is, a leaf node may be constrained by other nodes (represented by an outgoing edge), but does not serve as a constraint for any nodes. So, in FIG. 1B, the graph 138 includes two single leaf nodes, nodes 140*e* and 140*f*. In the algorithm 150, leaf nodes may be processed in parallel.

At 158, a deletion request is processed for the leaf nodes. For example, the deletion request can be to remove a subset of data stored in the leaf nodes older than a specified timestamp, newer than a particular timestamp, or within a particular range of timestamps, and 158 can include identifying data, such as relational database records, satisfying the deletion criteria. In a particular example, a new transaction is initiated to accomplish the particular deletion operations for the current set of leaf nodes.

The identified data (such as particular records of particular tables serving as the leaf nodes) is deleted from the leaf nodes at 162. Processed leaf nodes (again, particular data objects 104, such as tables, of the graph 138) are "removed" from the set of nodes 140 being considered by the algorithm 150 at 166. That is, the processed leaf nodes are still part of the graph 138, or corresponding information, but are treated as being removed from the graph for the remainder of the execution of the algorithm 150. Deleting the data from the leaf nodes at 162 can include removing relevant data (such as table records) in a single transaction. "Removal" of leaf nodes will be further explained with respect to FIGS. 2A-2E.

If additional nodes 140 remain to be processed, the algorithm 150 returns to 154 to identify leaf nodes in the modified graph resulting from the "removal" of the previous leaf nodes from the graph 138, where, again, in a specific example, the leaf nodes can correspond to tables with records that have no references that might block deletion of such records that satisfy particular criteria, which can include particular timestamp filter values. If no additional nodes remain to be processed, the algorithm 150 can terminate.

The algorithm 150 illustrates an advantage of disclosed techniques. That is each iteration of operations 154-162 can be performed as a unit. Thus, for example, rather than the relevant data objects 104 being locked for the entire execution of the algorithm 150, the data objects, or particular data in the data objects (such as particular records of particular tables) only need to be locked for a given iteration. Further, in at least some implementations, only the data objects 104 use in a given iteration, corresponding to a current set of leaf nodes are locked, as compared with typical cascading delete scenarios where the entire set of data objects involved in the deletion, or at least the entire set of records that are subject to deletion, would typically be locked for the duration of the process. Typically, database locking is used to ensure data integrity, prevent data corruption and conflicts, achieve data consistency and isolation, avoid deadlocks, manage transaction rollback and recovery, offer granular control, and prevent lost updates. Is it generally preferable to hold locks for smaller durations, to improve system performance, while achieving desired goals. It is also generally preferable to perform locking on smaller "units," such as locking particular table records rather than entire tables.

As a further illustration of the operation of the algorithm 150, nodes 140*e* and 140*d* are shown with example records 170*a*, for node 140*e*, and 170*b*, for node 140*d*. As will be further described in the discussion of FIGS. 2A-2E, node 140*e* can first be processed, along with node 140*f*, as they are the only leaf nodes in the graph 138 as illustrated. It can be determined that the record 170*a* of the leaf node 140*e* does not provide any referential constraints. For example, where the node 140*e* represents a table, it can be determined that the table does not contain a primary key value that is referenced by a foreign key of another table. The record 170*a* can thus be safely deleted, since its deletion will not remove a primary key value needed to have a valid foreign key value in another table.

The node 140*e*, as well as the node 140*f* (using a similar analysis), can then be "removed" from the graph, and so at a next iteration of the algorithm 150 node 140*d* is identified as the sole leaf node (since the other remaining nodes having incoming edges, thus having attributes serving as referential constraints for one or more other nodes). Since, at this point with the removal of node 140*e*, the node 140*d* does not provide any referential constraints to its child node 140*e*, the record 170*b* can be deleted. The use of values for the timestamp attribute in a deletion request helps ensure that records from nodes that were processed earlier, such as node 140*e*, have already been deleted. Consider an alternative scenario where node 140*d* is processed before node 140*e*. In this case, removal of the record 170*b* would cause the primary key value of "12" to be deleted, and so the foreign key attribute H' of the node 140*e* would contain a value that is no longer a primary key value in node 140*d*, causing referential integrity to be violated.

Disclosed techniques can include checking referential constraints before deleting data in a particular node 140. That is, if a node 140 referentially constrains another node (that is, is a parent of a child table, such as where the parent has a primary key attribute and the child has a foreign key attribute that is constrained by the primary key attribute of the parent), prior to deleting data from the parent node, it can be confirmed that deletion of the data will not cause a referential constraint violation in the child node even though, according to the algorithm 150, the child node is processed before the parent node.

FIGS. 2A-2E illustrate a graph 204 that corresponds to the graph 138 of FIG. 1B, where nodes (or vertices) 206 (shown as 206*a*-206*f*) correspond respectively to the data objects 104*a*-104*f* of FIG. 1A and the nodes 140*a*-140*f* of FIG. 1B, and how the graph 204 can be processed using the algorithm 150. The graph 204 also illustrates edges 208 (shown as edges 208*a*-208*f*) between the nodes 206, which are labelled with the foreign key attributes of the data objects 104 that give rise to these referential constraints.

The discussion of FIGS. 2A-2E describes how leaf nodes can be iteratively "generated" and analyzed, and appropriate data deleted. Although not described in this discussion, as discussed elsewhere, optionally, prior to deleting data, it can be confirmed that data to be deleted does not provide a referential constraint to another node.

Figure 2A:
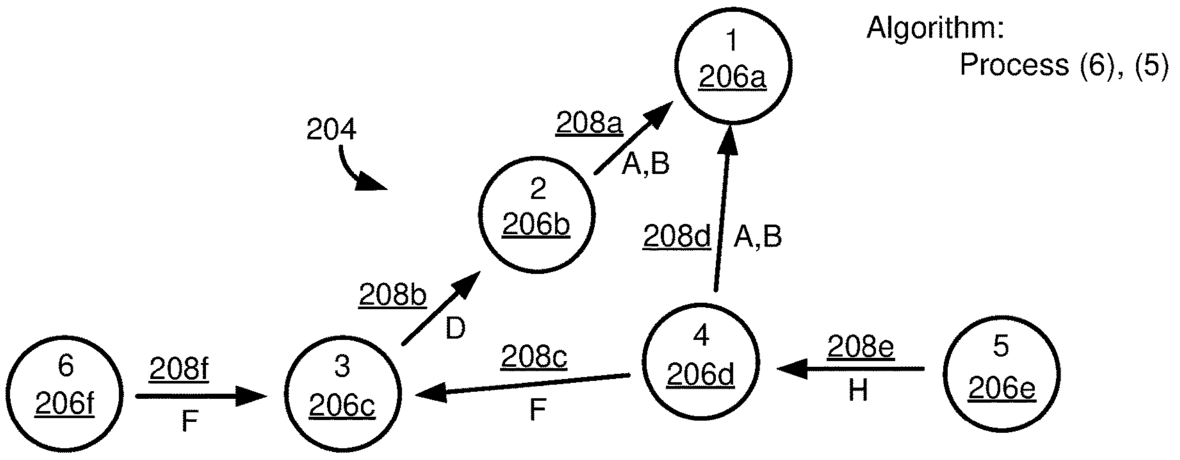
FIGS. 2A-2E illustrate the application of the process FIG. 1B to the graph of FIG. 1B.

In FIG. 2A, the graph 204 includes all the nodes 206. According to the algorithm 150, the graph 204 is analyzed to determine leaf nodes. Analyzing the graph 204, it can be determined that nodes 206*f* and 206*e* are the only leaf nodes, as they are the only nodes 206 with no incoming edges 208 (that is, they do not serve as "parent" tables for any "child" tables). According to the algorithm 150, deletion requests are processed for nodes 206*f* and 206*e* and data to be deleted from the leaf nodes is identified. The data can then be deleted from the leaf nodes. The leaf nodes, in this case node 206*f*, and its associated edge 208*f* and node 206*e* and its associated edge 208*e*, are then removed from the graph 204 (illustrated by showing the nodes 206*f* and 206*e* and their associated edges in dashed lines) to provide the updated graph shown in FIG. 2B. Since there are multiple leaf nodes in a single iteration of the algorithm 150, both of these nodes can be processed in parallel, although they can also be processed serially if desired. Parallelization can be carried out in a "map reduce" style, where parallel deletion operations are controlled by a single main process.

Figure 2B:
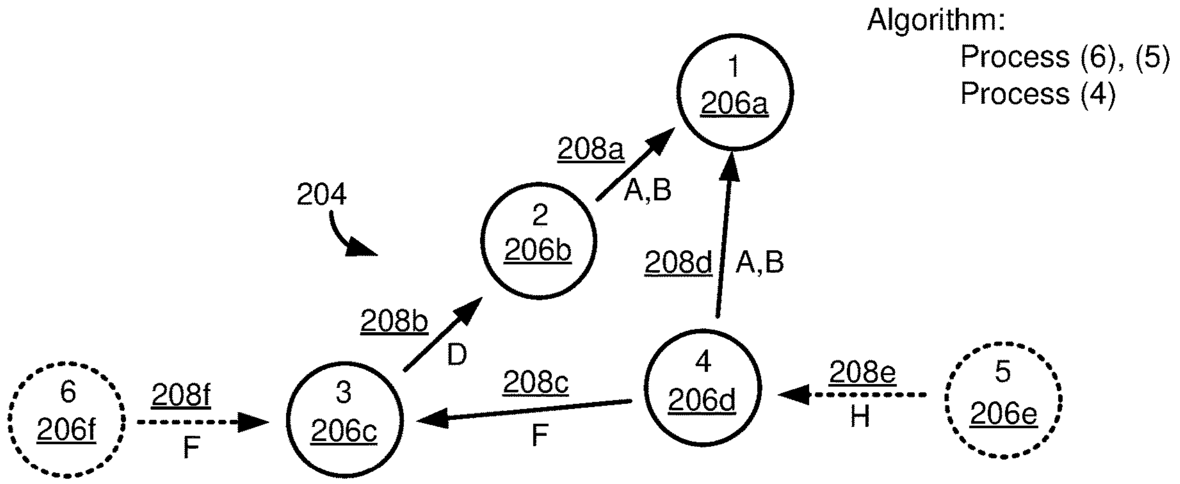

In FIG. 2B, the graph 204 is once again analyzed to identify leaf nodes. Node 206*d* is the only node that has no outgoing edges, and thus is the only leaf node at this iteration. The relevant data can be identified and deleted, and then the node 206*d* and its edges 208*c* and 208*d* can be removed from the graph 204, providing the updated graph shown in FIG. 2C.

Figure 2C:
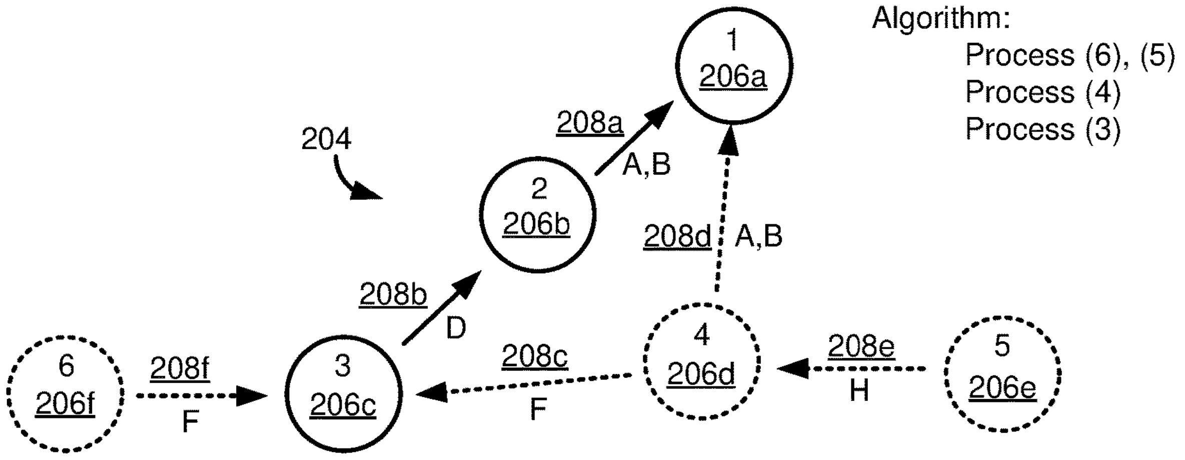

In FIG. 2C, only node 206*c* has only outgoing, and no incoming, edges, and so is the only leaf node for this iteration of the algorithm 150. Accordingly, relevant data is identified and deleted for the node 206*c*, and then the node and its edge 208*d* are removed from the graph 204 to provide the updated graph shown in FIG. 2D.

Figure 2D:
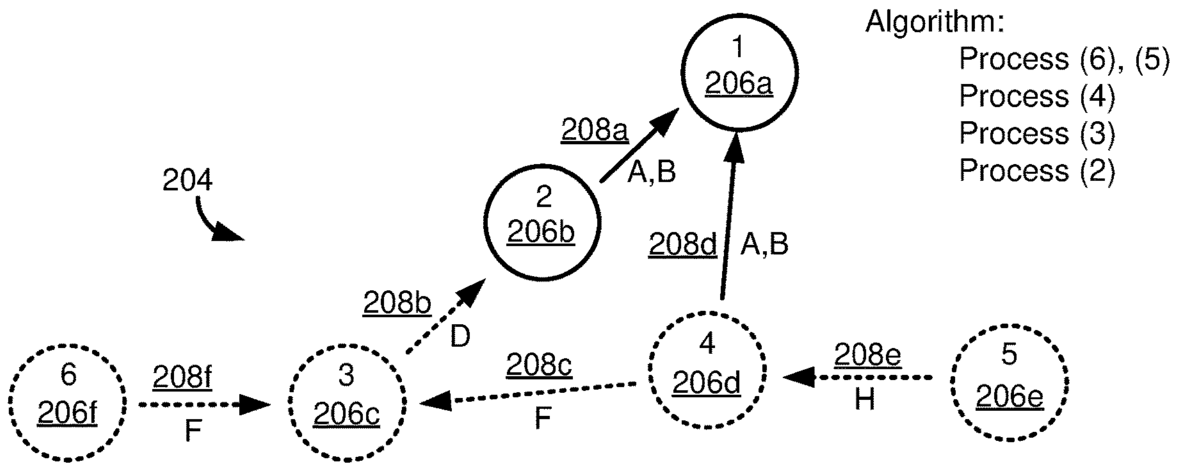

In FIG. 2D, node 206*b* is the only node with only outgoing edges, and therefore is the only leaf node in the graph 204. The relevant data is identified and deleted for the node 206*b*, and then the nodes, as well as its associated edge 208*e*, are removed from the graph 204 to provide the updated graph of FIG. 2E.

Figure 2E:
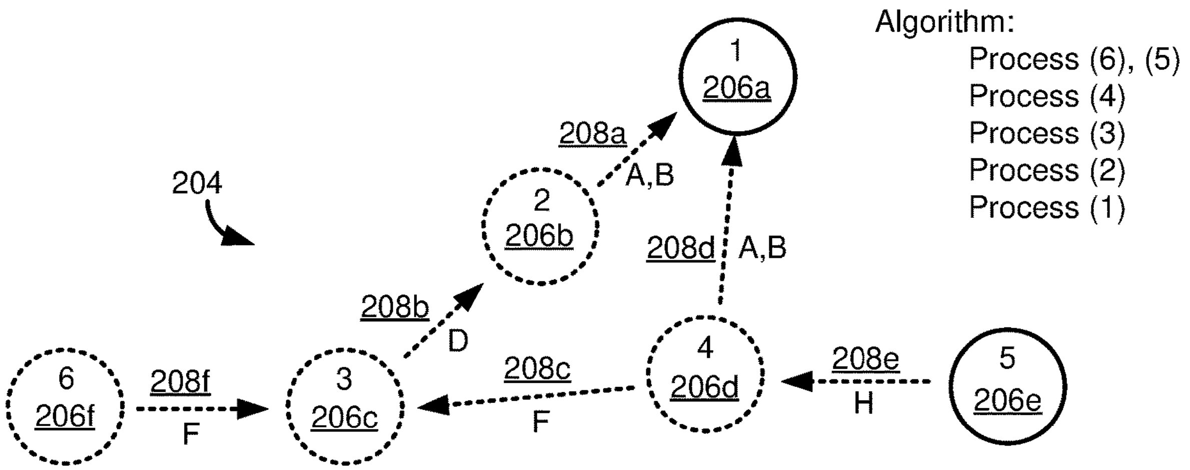

The graph 204 in FIG. 2E has a single node 206*a*. Relevant data can be identified and deleted with respect to the node 206*a*. Since node 206*a* was the last remaining node, the algorithm 150 then terminates.

Figure 3:
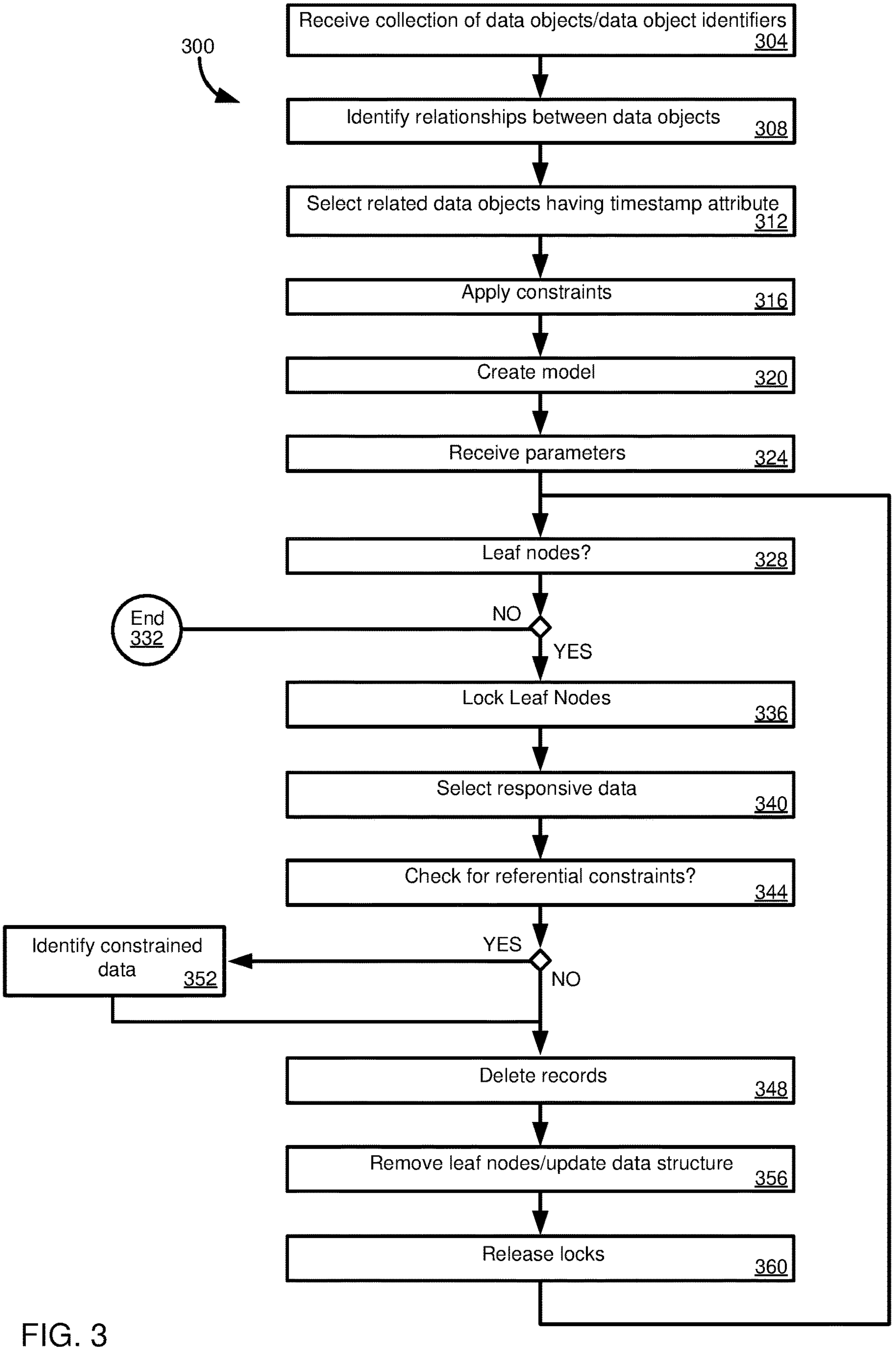
FIG. 3 is a flowchart of a process for identifying a set of related data objects, and for processing delete requests for such data objects using disclosed techniques.

Example 3—Example Process for Creating Sets of Interdependent Data Objects and Processing Delete Operations Therefor As discussed, an advantage of disclosed innovations is that they can be used with arbitrary data models, rather than requiring custom data deletion/clean up solutions to be developed. FIG. 3 illustrates a process 300 that integrates schema analysis/graph creation along with a process for performing deletion operations on data objects with referential constraints.

A collection of data objects or data object identifiers is received at 304. 304 can include receiving information, such as in response to a query, from a metadata repository, such as a data dictionary (which can also be referred to as a system catalog). The data dictionary 122 (containing database metadata) of FIG. 1A is an example of a repository from which data is received at 304.

The data received at 304 typically incudes identifiers of particular data objects and information regarding relationships between different data objects. In the case of relational database tables, the information regarding relationships can be in the form of attributes that are identified as serving as primary keys for a particular database table, or attributes that are identified as serving as foreign keys for a particular table. Typically, such foreign key relationships specifically identify a "source" object (for which the foreign key attribute or attributes serve as the primary key) in the definition of a data object including the foreign key. For example, consider the following code that declares Table 1 and Table 2:

```
CREATE TABLE Table1 (
  ID INT PRIMARY KEY,
  . . .
);
CREATE TABLE Table2 (
  ID INT PRIMARY KEY,
  Table1ID INT,
  . . .
  FOREGN KEY (Table1ID) REFERENCES Table1(ID)
```

This information may be stored in the following tables of a data dictionary:

TABLE

Dictionary

| Table Name | Table Description |
|---|---|
| Table 1 | The first table |
| Table 2 | The second table |

Column Dictionary

| Table Name | Column Name | Data Type | Column Description | IsPrimaryKey |
|---|---|---|---|---|
| Table 1 | Id | INT | Identifier for Table1 | Yes |
| Table 2 | Id | INT | Identifier for Table2 | YES |
| Table 2 | Table1Id | INT | Foreign key reference to Table1 | No |

Foreign Key Dictionary

| Foreign Key Name | Source Table | Source Column | Target Table | Target Column |
|---|---|---|---|---|
| FK_Table1_Table2 | Table2 | Table1Id | Table1 | Id |

At 308, relationships between data objects are identified. This can include identifying one or more sets of data objects that are related by referential constraints. In a particular implementation, the information received at 304 can be used to construct a graph, and the graph can be traversed at 308 to identify related data objects. For example, techniques such as depth-first search or breadth-first search can be used. FIG. 4A illustrates example python code for implementing the tables in the example data dictionary described above, as well as for extracting information from the data dictionaries, which can correspond to operations at 304.

FIG. 4B illustrates example code for retrieving node and edge information obtained using the code of FIG. 4A, as well as example execution results showing the node and edge information. FIG. 4B can also correspond to the operations at 304, where data from a data dictionary is processed to a format that is more easily analyzed by computer code.

FIG. 4C illustrates example python code for identifying sets of related tables using traversal techniques, which can correspond to the operations at 308. FIG. 4D illustrates example python code for breaking a larger graph into subgraphs, which can then be analyzed using the code of FIG. 4B, and which can allow the graph creation processes to be parallelized, as well as example output. In the code of FIG. 4D, a slightly more complex example is used where five tables are involved. These five tables can be represented in the same format as the data dictionary above, and the code in FIG. 4D illustrates an example table dictionary 470 and foreign key dictionary 474 that can be used in the subgraph identification process.

Returning to the process 300 of FIG. 3, related objects having a timestamp attribute are selected at 312. That is, as described, at least in some implementations the techniques of the present disclosure are used for record deletion operations that are based on timestamp criteria. So, sets of related nodes can be pruned to those that are both related and have an appropriate timestamp attribute. Alternatively, the operations at 312 can be performed at another point in the process 300. For example, receiving a collection of data objects/identifiers at 304 can be in response to a query that only selects data objects having the timestamp attribute. Or, a larger set of data objects can be received at 304, but the operations at 312 can be performed prior to identifying relationships between the objects at 308. In either of these alternatives, data objects that lack the timestamp attribute can be dropped from a list of data objects to be included in a graph/analyzed.

Optionally, constraints can be applied at 316. Examples of constraints can include limiting data objects to be included in a graph. In one particular implementation, a maximum number of indirections can be specified, such as a number of indirections from a specified data object. Constraints can also include checking to see whether particular data objects are on an "allow list" or a "deny list." In particular, some data objects may store particularly important data, and it may be desirable to protect such information from accidental deletion. Thus, it may be desirable to require a delete operation specific to that data object. Or, in another implementation, deletions as part of a "group" delete process can performed if the deletion is directly specified for the data object, but not if the data object is inferentially brought into the delete process based on a foreign key relationship.

A model, such as a graph, is created at 320.

The process 300 is shown as including the operations 304-320 involved in creating a model that can be used in processing requests, as well as operations in processing requests, as will be further described. However, the model creation and model use processes can be performed at different times. For example, a model can be created using the operations 304-320 and then stored and retrieved for use at a later time in response to a processing request.

The "processing" portion of the process 300 begins at 324 where request parameters are received. In a particular example, the request parameters can be in the form of a database query (where a database query, as used herein, includes operations that manipulate data, such as insert, update, or deletion operations, as well as operations that only read data). The request parameters include criteria for a timestamp column, such as selecting data associated with a timestamp value that is older than a certain value, newer than a certain value, or has a value within a specified range of values. A deletion request can include additional criteria, such as including particular attribute values for other attributes of data objects in the collection of data objects being analyzed (for example "DELETE FROM DATA OBJECT A WHERE DEPARTMENT_ID=1 AND TIMESTAMP<CURRENT_TIMESTAMP–30").

At 328, it is determined whether any leaf nodes remain to be analyzed. If not, the process can end at 332. If leaf nodes remain to be analyzed, the leaf nodes can be selected for processing. In the case where multiple leaf nodes are present, the remaining operations can be performed in parallel, if desired, but could also be performed sequentially. In particular implementations, such as when the data objects are relational database tables, the leaf nodes can optionally be locked at 336.

Data satisfying deletion criteria is selected from the leaf node data objects at 340. At 344, it can be determined whether data should be checked for referential constraints prior to deletion. That is, for example, the process 300 can be associated with a setting where data satisfying timestamp criteria is deleted according to the process, even if there are referential constraints, or where data satisfying timestamp criteria is only deleted if there are no referential constraints. As described with respect to FIG. 1B, checking for referential constraints before deleting data can help ensure that deletion of values for constraining attributes, such as a primary key, in a parent data object does not cause a referential constraint violation for a child data object (even though disclosed processes work from child tables to parent tables).

Typically, the process 300 is performed multiple times, such as according to a schedule. Based on the operation of the process 300, even if data having referential constraints are not deleted from leaf nodes, as additional execution instances of the process 300 are carried out, eventually all data satisfying the deletion criteria will be free of referential constraints, and thus deleted.

Although the process 300 has been described as including the determination at 344, in other implementations this determination can be omitted, and a process can either always check for referential constraints or never check for referential constraints. In a further implementation, particular data objects can be identified that should/or should not be checked for referential constraints, and that information can be used at 344 in determining whether referential constraints should be checked for a given data object.

If the determination at 344 indicates that data is not to be checked for referential constraints, or for any particular data objects for which referential constraint checks are not required, the data meeting the deletion criteria is deleted at 348. If the determination at 344 indicates that data is to be checked for referential constraints, the responsive data can be analyzed at 352, and constrained data can be identified. For example, the operations at 352 can include checking foreign key relationships, such as indicated in the edge information maintained for data objects (including as described with respect to FIGS. 1A, 1B, 2A-2E, 4A, 4B, and 4C. If given data, such a table record, has a referential constraint with data in another data object that defines the constraint (for example, primary key values of a table that serve as constraints on values for a foreign key of another table), an identifier for the given data, such as its primary key value, can be added to a list of constrained data. The process 300 can proceed to 348, where data is deleted except for data in the list of constrained data.

In one example, the operations at 352 can include confirming that primary key values of records to be deleted in a leaf node do not exist in a child table constrained by the leaf node (even though, according to the process 300, the child node would have been processed in an earlier iteration of processing the set of nodes). In another example, identification of constrained data is performed using a left join between the leaf node and its child node, where records of the leaf node associated with a NULL result from the child table are deleted, as the NULL result confirms that the primary key value does not appear in the child table.

Note that deleting data at 348 can include the processing of referential constraints, even if not implemented as a separate operation 352. That is, rather than being explicitly specified in computer code implementing the process 300, referential constraint checks can be performed using existing logic in a computing system that processes deletions at 348. For example, a relational database may include logic to check for referential constraints before deleting data, where the data is not deleted if a referential constraint exists.

In addition to avoiding referential constraint violations (such as an invalid foreign key value), checking for referential constraints can be useful, whether as an explicit operation 352 or implicitly during data deletion at 348, since otherwise a request for records related to a particular value may retrieve a limited set of data, rather than retrieving all data or no data. For example, assume records for a particular foreign key value are initially selected for deletion from Table A, which has a foreign key relationship with Table B. If records were deleted from Table B before the records with the corresponding primary key were removed from Table A for a particular foreign key value, but then a request was issued to retrieve records from Tables A and B, the result would be incomplete. The incomplete result occurs because information from Table B would not be included in the results, which can cause inaccurate results or processing errors to be generated.

As discussed, in the case of strict referential constraints, such as foreign key relationships, deleting a primary key value can cause referential constraint violations in a child table. Even in the absence of a strict violation, deleting data from a parent table before a child table can cause data in the child table to become "stranded"/less accessible. For example, the removal of the value from the parent table may cause the data of the child table to no longer be accessible through a join operation involving the parent table.

Alternatively, rather than delaying processing of data with referential constraints, locks can be maintained for all data objects during execution of the operations 336-360, so that a consistent set of deletions is processed prior to data being available for queries/processing outside of the process 300.

After deleting data at 348, the process 300 proceeds to update a data structure or data model used in the process at 356. That is, the leaf nodes that were just analyzed can be removed from further consideration, as described with respect to FIGS. 1B and 2A-2E. Provided that additional nodes remain to be analyzed, which is determined when the process 300 returns to 328, updating the data structure or model at 356 results in a new set of leaf nodes to be processed. Optionally, if the leaf data objects were locked at 336, the locks can be released at 360 before the process 300 returns to 328.

Example 4—Example Addition of Timestamp Attribute for Data Objects

The process of creating data model representations, such as graphs, to be used in a deletion process, as well as the deletion process itself, can include additional features. For example, as described with respect to operation 312 of the process 300 of FIG. 3, data objects are selected for use in a data object processing set (such as a graph) if they include timestamp columns. A technique for defining a data object processing set can be modified to automatically add timestamp attributes to data objects lacking this attribute, to add such attributes in response to user input, or to alert a user of data objects lacking a timestamp attribute. In particular, the timestamp attribute can be used in the process of checking for referential constraints. For example, when processing a deletion request for records from a "child" table that is subject to a timestamp constraint, it can be determined whether the "parent" table still has records that form the basis of the referential constraint and that also satisfy the timestamp constraint.

Figure 5C:
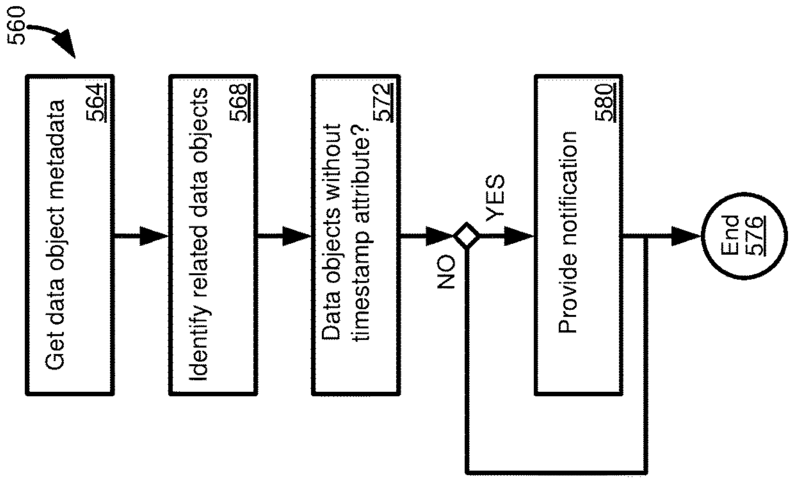
FIGS. 5A-5C are flowcharts of various processes that can be used when data objects are identified that do not include timestamp attributes.
Figure 5B:
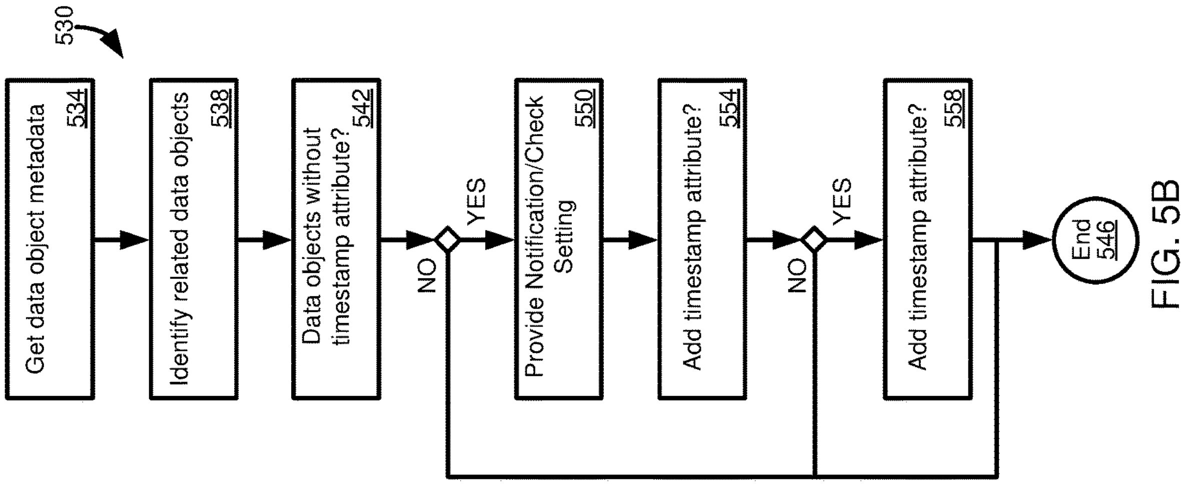
Figure 5A:
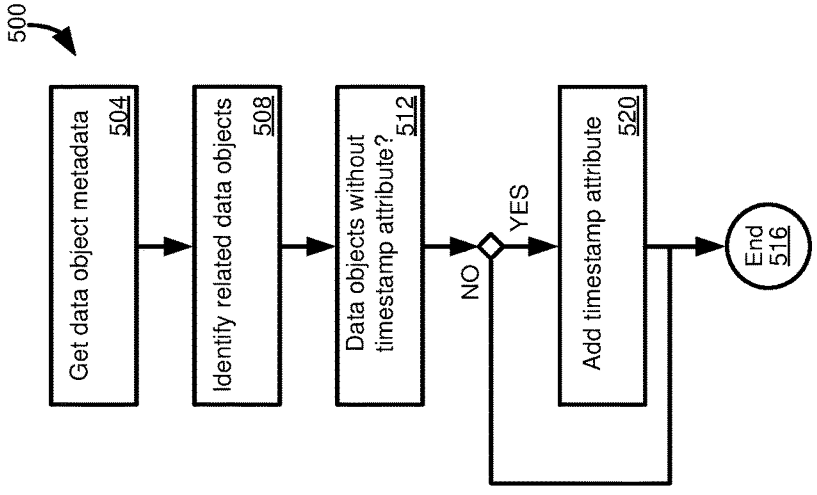

FIGS. 5A, 5B, and 5C illustrate example processes 500, 530, 560 that respectively illustrates these scenarios. The processes 500, 530, 560 can be incorporated into the process 300, such as prior to, or during, selecting related objects having a timestamp attribute at 312.

Turning first to the process 500 of FIG. 5A, data object metadata is retrieved at 504, which can be analogous to operation 304 of the process 300 of FIG. 3. Related data objects can be determined at 508, which can be analogous to the operation 308. At 512, it is determined where any data objects of the set of related data objects lack a timestamp attribute. If not, the process 500 ends at 516. If so, the process 500 adds timestamp attributes to the relevant data objects (in the case of relational database tables, using suitable DDL commands) at 520, and then ends at 516.

Taking next the process 530 of FIG. 5B, operations 534, 538, and 542 are analogous to operations 504, 508, and 512, and so are not further described. If it is determined at 542 that no data objects were identified that lack a timestamp attribute, the process 530 can end at 546. If data objects were identified that lack a timestamp attribute, a notification can be provided, such as to a user, at 550. In some cases, the process 530 can be associated with a setting that determines whether timestamp attributes should be added, and this operation can be performed at 550. At 554, it is determined whether user input, or a setting, indicates that timestamp attributes should be added. If not, the process 530 can end at 546. If so, the timestamp attributes can be added at 558, and then the process 530 can end at 546.

In the process 560 of FIG. 5C, operations 564, 568, and 572 are analogous to operations 504, 508, and 512. If it is determined at 572 that no data objects were identified that lack a timestamp attribute, the process 560 ends at 576. If data objects were identified that lack a timestamp attribute, a notification can be provided at 580, such as a to a user, and the process 560 then ends at 576.

Example 5—Example Index Creation for Data Objects

As discussed in Example 4, disclosed processes can be modified to improve their efficiency. In particular, performance of a deletion process can be improved if indexes are available on attributes that serve as reference constraints, such as on columns that are defined as foreign keys for a relational database table. Similarly, performance can be improved if indexes are available on the timestamp attributes of the relevant data objects. However, the use of indexes is not limited to relational data, as inverted indexes, JSON indexes, or XML indexes can be used, for example, for semi-structured data. Similarly, at least certain NoSQL databases support column/attribute indexes.

Figure 6A:
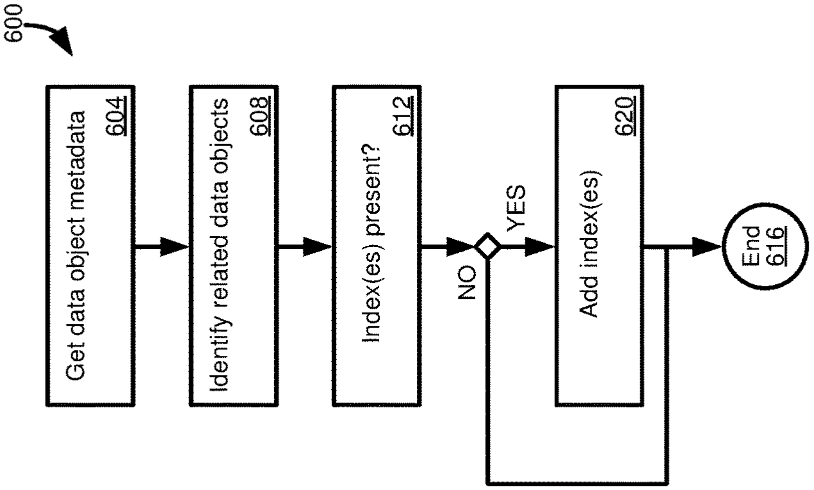
FIGS. 6A-6C are flowcharts of various processes that can be used when data objects are identified that are not associated with indexes on dependency attributes or a timestamp attribute.
Figure 6B:
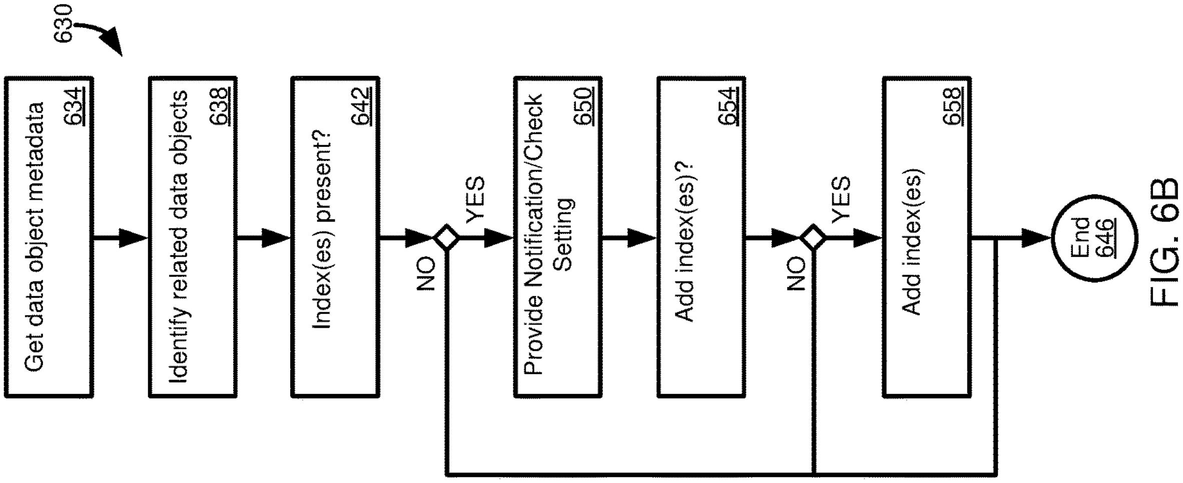
Figure 6C:
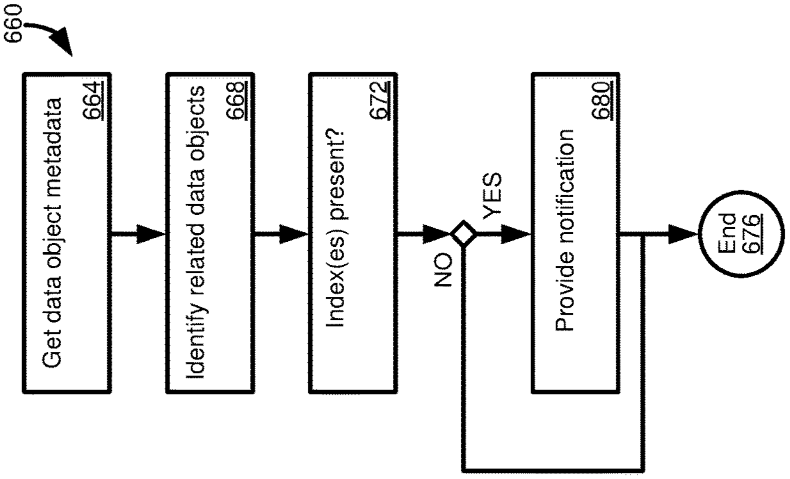

A technique according to the present disclosure, including the process 300 of FIG. 3, for defining a data object processing set can be modified to automatically add indexes on relational constraint attributes to data objects lacking such an index, to add such indexes in response to user input, or to alert a user of data objects lacking such an index. A technique for defining a data object processing set can be modified to automatically add indexes on timestamp attributes under similar conditions. A technique according to the present disclosure can also check for, and optionally add, indexes on both referential constraint attributes and timestamp attributes. FIGS. 6A, 6B, and 6C illustrate example processes 600, 630, 660 that respectively illustrate these scenarios. The processes 600, 630, 660 can be incorporated into the process 300, such as after, or as part of, identifying relationships between models, including as part of creating a model at 320.

Turning first to the process 600 of FIG. 6A, data object metadata is retrieved at 604, which can be analogous to operation 304 of the process 300 of FIG. 3. Related data objects can be determined at 608, which can be analogous to the operation 308. At 612, it is determined where any data objects of the set of related data objects lack an index on attributes serving as referential constraints, lack an index on timestamp attributes, or both, depending on implementation. If not, the process 600 ends at 616. If so, the process 600 creates an index for the relevant data objects (in the case of relational database tables, using suitable DDL commands) at 620, and then ends at 616.

Taking next the process 630 of FIG. 6B, operations 634, 638, and 642 are analogous to operations 604, 608, and 612, and so are not further described. If it is determined at 642 that no data objects were identified that lack the relevant indexes, the process 630 can end at 646. If data objects were identified that lack the relevant indexes, a notification can be provided, such as to a user, at 650. In some cases, the process 630 can be associated with a setting that determines whether relevant indexes should be added, and this operation can be performed at 650. At 654, it is determined whether user input, or a setting, indicates that indexes should be created. If not, the process 630 can end at 646. If so, the index can be added at 658, and then the process 630 can end at 646.

In the process 660 of FIG. 6C, operations 664, 668, and 672 are analogous to operations 604, 608, and 612. If it is determined at 672 that no data objects were identified that lack the relevant indexes, the method 660 ends at 676. If data objects were identified that lack a relevant index, a notification can be provided at 680, such as a to a user, and the process 660 then ends at 676.

Example 6—Example Implementation of Disclosed Techniques

Figure 7:
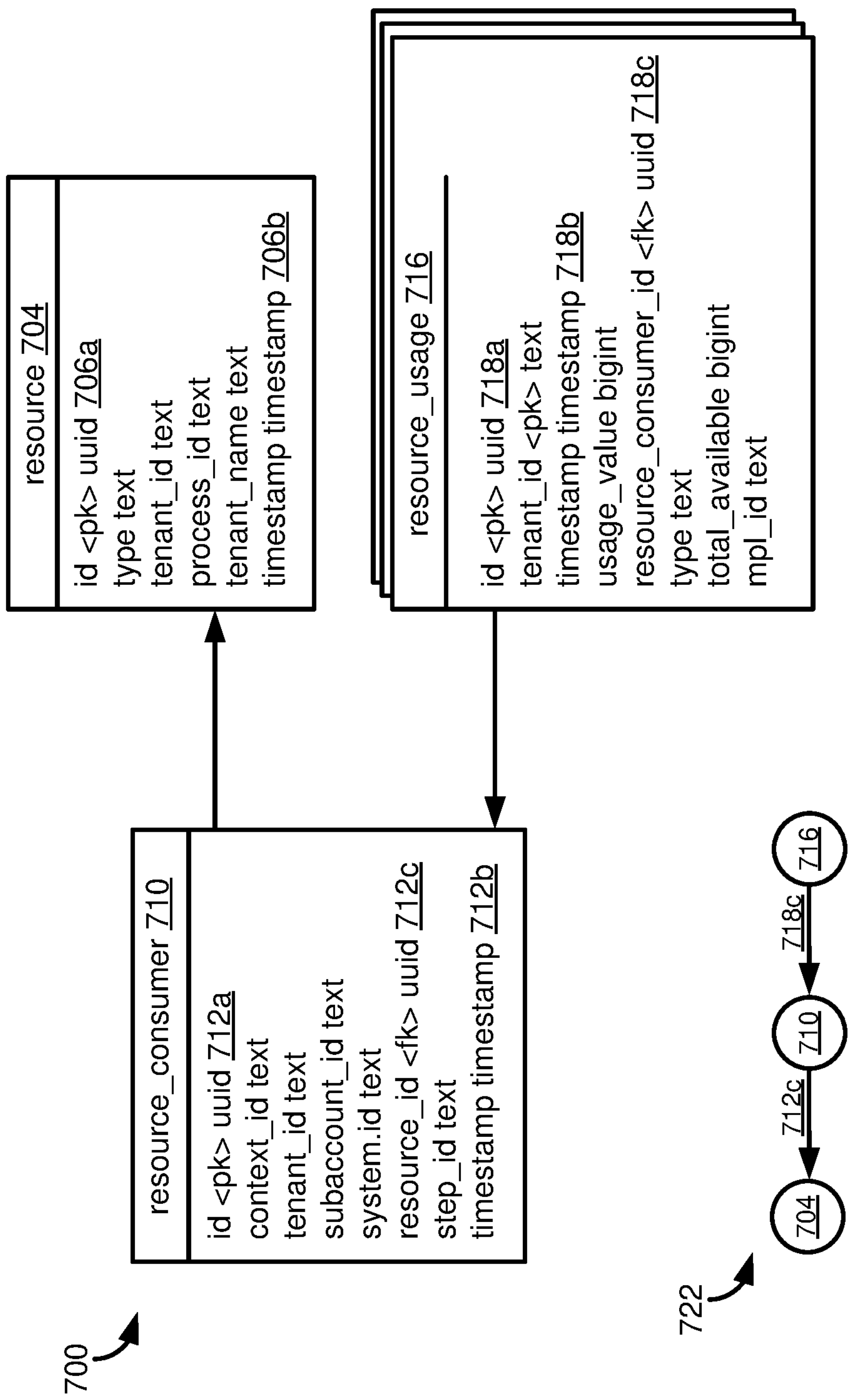
FIG. 7 illustrates an example set of tables, and a graph representing such tables and their relationships, that is used in a discussion of a particular implementation example of disclosed techniques.

FIGS. 7-9 illustrate a specific example of how disclosed deletion processes can be implemented for a set of related tables. Note that in this case, the relationships between the tables are already known, so the example primarily relates to the deletion process described with respect to FIGS. 1A and 1B, FIGS. 2A-2E, and operations 324-360 of FIG. 3.

Discovery of the related tables, and creating a model/graph of the tables, can be performed as described with respect to those figures, as well as the description provided with respect to FIGS. 4A-4CC.

FIG. 7 illustrates a particular set of related tables 700. A resource table 704 includes an attribute 706*a* that serves as the primary key for the table, and a timestamp attribute 706*b*. A resource_consumer table 710 includes a primary key attribute 712*a* and a timestamp attribute 712*b*. The resource_consumer table 710 also include a resource_id attribute 712*c* that is a foreign key defined with respect to the primary key attribute 706*a* of the resource table 704.

A resource_usage table 716 includes a primary key attribute 718*a* and a timestamp attribute 718*b*. The resource usage table 716 also include a foreign key attribute 718*c* that is defined with respect to the primary key attribute 712*a* of the resource_consumer table 710.

The tables 704, 710, 716 are illustrated as nodes in a graph 722, with the edges of the graph labelled with the foreign key attributes. According to the previously described deletion processes, it can be seen that a deletion process would first process the resource_usage table 716, since it is initially the only leaf node. After processing the resource_usage table 716, the resource_consumer table 710 is the only leaf node and is processed. After processing the resource_consumer table 710, the resource table 704 is the only remaining node, and is processed.

FIGS. 8A-8D provide example commands for creating the tables 704, 710, 716, as well as indexes on the foreign key and timestamp attributes. FIG. 8E provides example commands for filling instances of the table 704, 710, 716 with data.

FIGS. 9A-9E provide example code for processing deletions for data stored in instances of the tables 704, 710, 716 of FIG. 7. In particular FIG. 9A provides example code 900 that defines a test for a deletion process, DeleteObsoleteResourceUsage( ) that is further defined in FIG. 9C.

FIG. 9B illustrates example SQL commands 910, 912, 914 for deleting data in the tables 704, 710, 716 that are automatically generated using disclosed techniques. For example, the commands 910, 912, 914 can be generated at, or prior to, operation 340 of FIG. 3. That is, the commands 910, 912, 914 can define a selection of data at 340, and then cause the deletion of data at 348. In this case, the provided query conditions can be "TENANT_ID=123" and "TIMESTAMP<2023-06-07 17:26:35.688." According to the command 910, the query conditions are applied to the table 716, which is processed first by disclosed techniques, without the addition of additional conditions.

In contrast, the command 912 is applied to the table 710 when that table is the leaf node. In addition to the explicitly provided constraint, referential constraint 920 is included in the command 912. Referential constraint 920 restricts records to be deleted to those that do not exist in the table 716. Thus, for example records in the table 710 are only deleted if records having the corresponding tenant ID and satisfying the timestamp criteria have already been deleted from the table 716.

Command 914 for table 704 is similar to command 912, in that records are deleted if they satisfy the query conditions, but also a referential constraint 924 that the records to be deleted are not associated with records satisfying the query conditions that exist in the table 710.

FIGS. 9C-9E provide example code that deletes records satisfying query conditions, as well as referential constraints, including using the SQL commands 910, 912, 914 of FIG. 9B. In particular, FIG. 9C illustrates a function 930 that generates a query for record deletion for the resource_usage table 916 given an input of a tenant identifier and a retention period (such as where records older than the retention period will be deleted). The function 930 returns the number of deleted records. A function 934 deletes records associated with a provided tenant ID and retention period from the resource table 704 and the resource_consumer table 710 by calling a deleteObsoleteDataBasedOnTimestamp function.

FIG. 9D presents code for a deleteObsoleteDataBasedOnTimstamp function 938, which is the function called by the function 934 of FIG. 9C. The function 938 generates appropriate SQL commands, such as the commands 910, 912, 914 of FIG. 9B. A deleteRecords function carries out the deletion, where an example deleteRecords function 942 is provided in FIG. 9E.

A cleanupTenantData function 946 is also provided in FIG. 9E. The function 946 also calls the deleteObsoleteResourceUsage function 930 of FIG. 9C, but take arguments of a tenant identifier and a retention period that is specified in configuration settings.

FIGS. 9F-9I provide example code for an alternative implementation of a process for processing deletions for data stored in instances of the tables 704, 710, 716 of FIG. 7. As will be further described, rather than using selection conditions of the form 920, 924 of FIG. 9B, records that are not appropriately deleted, because primary key values of a parent table are still being used in a child table, can be performed using a left join operation (for example, in SQL). As is known in the art, a left join returns all rows of the left table of two tables being joined, and matching information from the right table of the two tables being joined. If the right table does not satisfy the join conditions, a NULL result is returned. By performing a left join between a parent table and a child table, a left join can be used to identify records in the parent table that do not have a corresponding primary key value in the child table, and therefore can be safely deleted.

FIG. 9F is similar to FIG. 9A, in that it contains code 950 that defines a test for a deletion process, DeleteObsoleteResourceUsage( ). FIG. 9G illustrates example SQL commands 960, 962, 964 for deleting data in the tables 704, 710, 716 that are automatically generated using disclosed techniques. As with the commands of FIG. 9B, the commands 960, 962, 964 can be generated at, or prior to, operation 340 of FIG. 3. That is, the commands 910, 912, 914 can define a selection of data at 340, and then cause the deletion of data at 348. As with the commands of FIG. 9B, the provided query conditions can be "TENANT_ID=123" and "TIMESTAMP<2023-06-07 17:26:35.688." Processing of the command 960 is analogous to processing the command 910, where no additional conditions are needed, because the table 716 does not serve as a parent table to any other tables.

As with the commands 912 and 914 of FIG. 9B, when the tables 710 and 704 are leaf nodes analyzed by a deletion process, conditions 970 are added. However, as described above, the nature of the conditions differs from the earlier described implementation. The conditions 970 define a set of results corresponding to records of the parent table (table 710 or 704) for which a corresponding record (such as a record having a particular primary key value, as well as satisfying timestamp criteria) does not exist in the child table (tables 716 and 710, respectively for parent tables 710 and 704). That is, the commands 970 identify null values obtained by the left join, and cause records having a null value retuned from a child table to be deleted.

FIGS. 9H and 9I provide example code that deletes records satisfying query conditions, as well as referential constraints, including using the SQL commands 960, 962, 964 of FIG. 9G.

Figure 10:
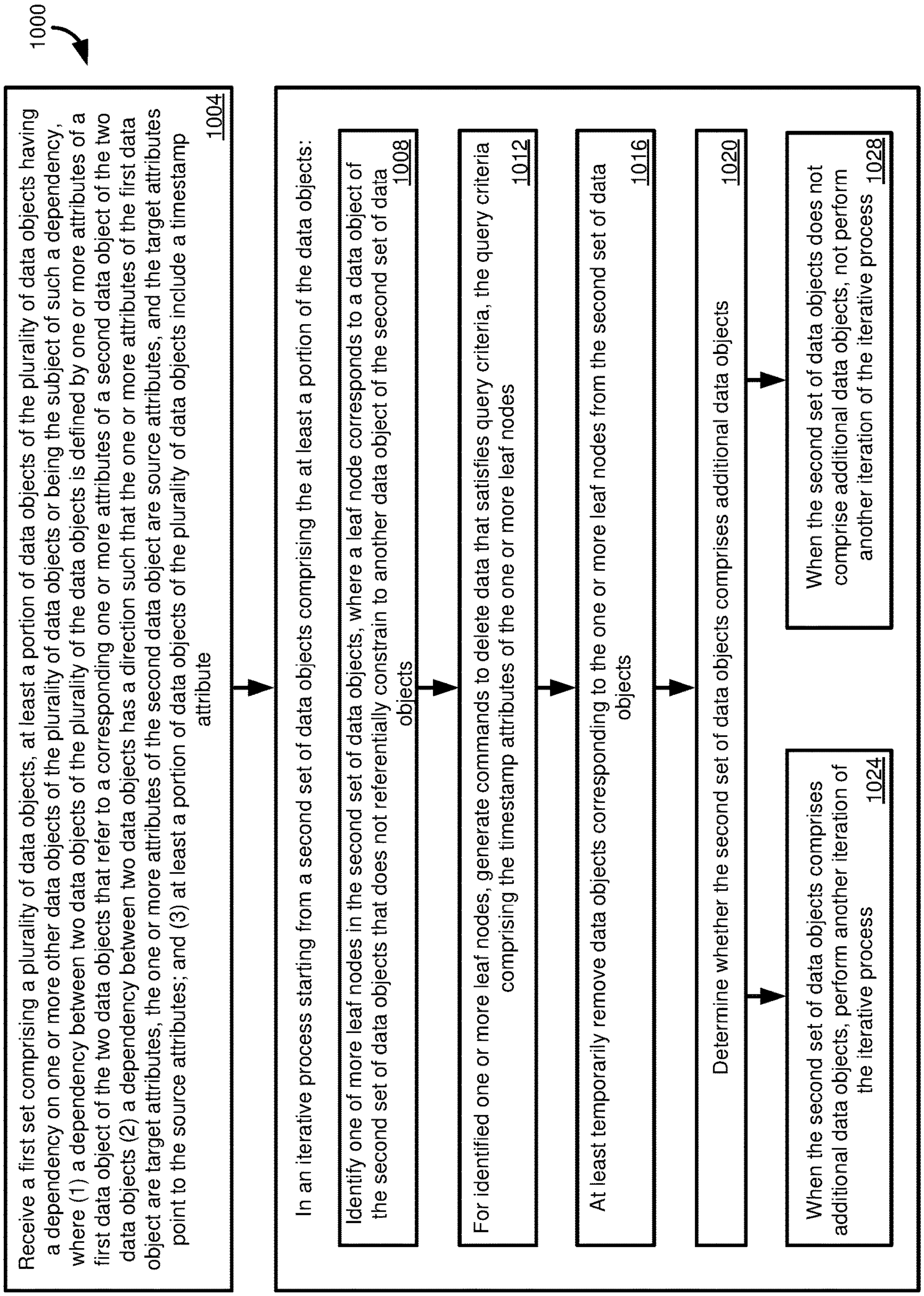
FIG. 10 is a flowchart of a disclosed data deletion process for a set of related data objects.

Example 7—Example Operations in Deleting Data for Interdependent Data Objects FIG. 10 illustrates an example data deletion process 1000 according to the present disclosure. At 1004, a first set comprising a plurality of data objects is received. At least a portion of data objects of the plurality of data objects have a dependency on one or more other data objects of the plurality of data objects or are the subject of such a dependency. A dependency between two data objects of the plurality of the data objects is defined by one or more attributes of a first data object of the two data objects that refer to a corresponding one or more attributes of a second data object of the two data objects. A dependency between two data objects has a direction such that the one or more attributes of the first data object are target attributes, the one or more attributes of the second data object are source attributes, and the target attributes point to the source attributes. At least a portion of data objects of the plurality of data objects include a timestamp attribute.

In an iterative process starting from a second set of data objects comprising the at least a portion of the data objects, one of more leaf nodes in the second set of data objects are identified at 1008. A leaf node corresponds to a data object of the second set of data objects that does not referentially constrain another data object of the second set of data objects. At 1012, for identified one or more leaf nodes, commands are generated to delete data that satisfies query criteria, the query criteria including the timestamp attributes of the one or more leaf nodes. Data objects corresponding to the one or more leaf nodes are at least temporality removed from the second set of data objects at 1016. At 1020, it is determined, whether the second set of data objects includes additional data objects. When the second set of data objects includes additional data objects, another iteration of the iterative process is performed at 1024. When the second set of data objects does not include additional data objects, another iteration of the iterative process is not performed at 1028.

Example 8—Computing Systems

Figure 11:
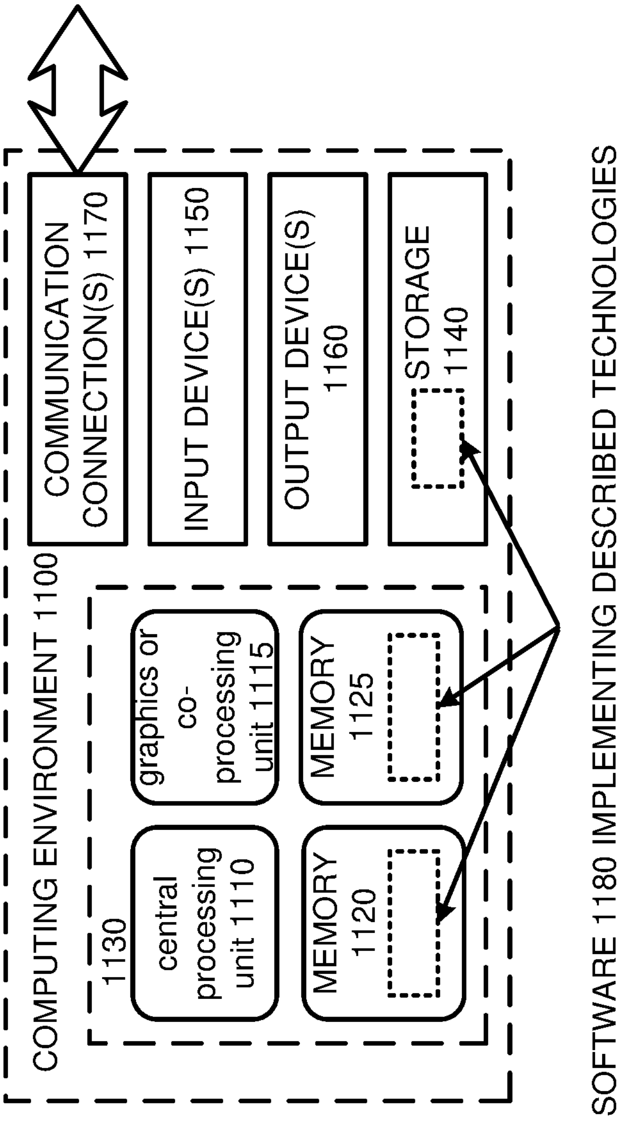
FIG. 11 is a diagram of an example computing system in which some described embodiments can be implemented.

FIG. 11 depicts a generalized example of a suitable computing system 1100 in which the described innovations may be implemented. The computing system 1100 is not intended to suggest any limitation as to scope of use or functionality of the present disclosure, as the innovations may be implemented in diverse general-purpose or special-purpose computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions, such as for implementing a database environment, and associated methods, described in Examples 1-7. A processing unit can be a general-purpose central processing unit (CPU), a processor in an application-specific integrated circuit (ASIC), or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s) 1110, 1115. The memory 1120, 1125 stores software 1180 implementing one or more innovations described herein, in the form of computer-executable instructions suitable for execution by the processing unit(s) 1110, 1115.

A computing system 1100 may have additional features. For example, the computing system 1100 includes storage 1140, one or more input devices 1150, one or more output devices 1160, and one or more communication connections 1170. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 may be removable or non-removable, and includes magnetic disks, magnetic tapes or cassettes, CD-ROMs, DVDs, or any other medium which can be used to store information in a non-transitory way, and which can be accessed within the computing system 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing system 1100. The output device(s) 1160 may be a display, printer, speaker, CD-writer, or another device that provides output from the computing system 1100.

The communication connection(s) 1170 enable communication over a communication medium to another computing entity, such as another database server. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 9—Cloud Computing Environment

Figure 12:
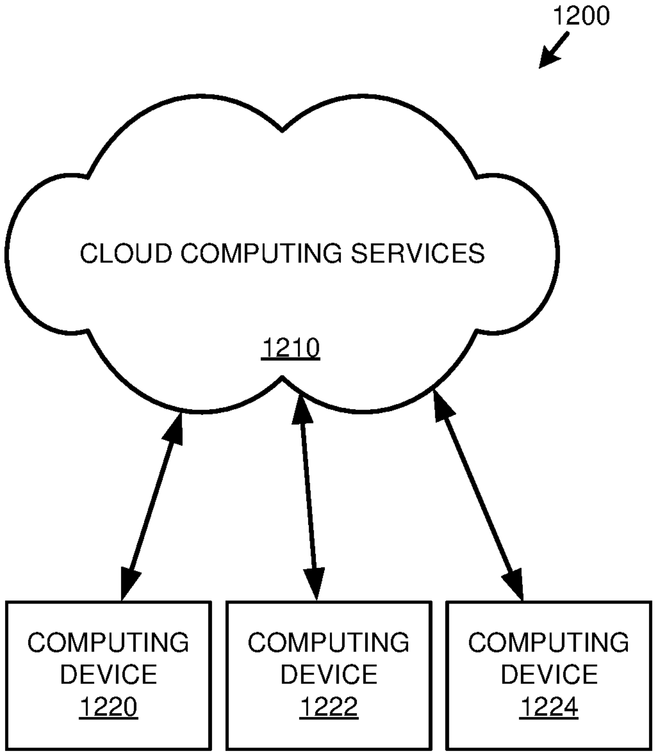
FIG. 12 is an example cloud computing environment that can be used in conjunction with the technologies described herein.

FIG. 12 depicts an example cloud computing environment 1200 in which the described technologies can be implemented. The cloud computing environment 1200 comprises cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 are utilized by various types of computing devices (e.g., client computing devices), such as computing devices 1220, 1222, and 1224. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operators (e.g., data processing, data storage, and the like).

Example 10—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 11, computer-readable storage media include memory 1120 and 1125, and storage 1140. The term computer-readable storage media does not include signals and carrier waves. In addition, the term computer-readable storage media does not include communication connections (e.g., 1170).

Any of the computer-executable instructions for implementing the disclosed techniques, as well as any data created and used during implementation of the disclosed embodiments, can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, Structured Query Language, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:

at least one memory;

one or more hardware processor units coupled to the at least one memory; and one or more computer readable storage media storing computer-executable instructions that, when executed, cause the computing system to perform operations comprising:

receiving a first set comprising a plurality of data objects, at least a portion of data objects of the plurality of data objects having a dependency on one or more other data objects of the plurality of data objects or being a subject of such a dependency, wherein (1) a dependency between two data objects of the plurality of data objects is defined by one or more attributes of a first data object of the two data objects that refer to a corresponding one or more attributes of a second data object of the two data objects (2) a dependency between two data objects has a direction such that the one or more attributes of the first data object are target attributes, the one or more attributes of the second data object are source attributes, and the target attributes point to the source attributes; and (3) at least a portion of data objects of the plurality of data objects comprise a timestamp attribute;

in an iterative process starting from a second set of data objects comprising the at least a portion of the data objects:

identifying one of more leaf nodes in the second set of data objects, wherein a leaf node corresponds to a data object of the second set of data objects that does not referentially constrain another data object of the second set of data objects;

for identified one or more leaf nodes, generating commands to delete data that satisfies query criteria, the query criteria comprising the timestamp attributes of the one or more leaf nodes;

at least temporarily removing data objects corresponding to the one or more leaf nodes from the second set of data objects;

determining whether the second set of data objects comprises additional data objects; and (1) when the second set of data objects comprises additional data objects, performing another iteration of the iterative process; or (2) when the second set of data objects does not comprise additional data objects, not performing another iteration of the iterative process.

2. The computing system of claim 1, wherein the query criteria comprises at least one value for the timestamp attribute and at least one condition defined with respect to the at least one value of the timestamp attribute.

3. The computing system of claim 2, wherein the query criteria further comprises at least one value for another attribute of a data object of the second set of data objects.

4. The computing system of claim 3, wherein the another attribute is used in a dependency between two data objects of the second set of data objects.

5. The computing system of claim 4, wherein the two data objects are relational database tables and the dependency is a foreign key relationship.

6. The computing system of claim 1, the operations further comprising:

defining the second set of data objects, the defining the second set of data objects comprising:

retrieving metadata of data objects of the plurality of data objects;

from the metadata, identifying dependencies between data objects of the plurality of data objects;

including in the second set of data objects data objects of the plurality of data objects that are related by dependencies.

7. The computing system of claim 6, the operations further comprising:

creating one or more data structures storing identifiers of data objects in the first set and relationships between data objects in the first set of data objects.

8. The computing system of claim 7, wherein the one or more data structures comprise a graph where the data objects in the first set of data objects form nodes of the graph and where attributes that are part of a dependency relationship between two nodes of the data objects in the first set of data objects form edges of the graph.

9. The computing system of claim 8, the operations further comprising:

traversing the graph to determine nodes in the second set of data objects.

10. The computing system of claim 1, the operations further comprising:

identifying data objects in the first set of data objects that do not include the timestamp attribute; and for at least a portion of the plurality of data objects in the first set of data objects that do not include the timestamp attribute, modifying a data object of the at least a portion of the data objects to include the timestamp attribute.

11. The computing system of claim 1, the operations further comprising:

identifying data objects in the first set of data objects that are not associated with an index on the timestamp attribute; and for at least a portion of the data objects in the first set of data objects that are not associated with an index on the timestamp attribute, creating an index on the timestamp attribute for a data object of the at least a portion of the data objects.

12. The computing system of claim 1, the operations further comprising:

identifying data objects in the first set that have a dependency on another data object in the first set of data objects and are not associated with an index on attributes associated with the dependency; and for at least a portion of the data objects in the first set of data objects that are not associated with an index on attributes associated with the dependency, creating an index on the attributes associated with the dependency for a data object of the at least a portion of the data objects.

13. The computing system of claim 1, the operations further comprising:

in the iterative process, for the one or more leaf nodes, identifying data that is in a leaf node of the one or more leaf nodes that constrains data of another data object of the second set of data objects, providing identified data;

wherein commands to delete data that satisfies the query criteria are not executed for the identified data for an iteration of the iterative process that includes the leaf node of the one or more leaf nodes.

14. The computing system of claim 13, wherein the another data object of the second set of data objects corresponds to a leaf node analyzed in a prior iteration of the iterative process.

15. The computing system of claim 1, wherein the iterative process is performed according to a schedule.

16. The computing system of claim 1, the operations further comprising:

prior to executing commands to delete data that satisfies the query criteria, locking the one or more leaf nodes.

17. The computing system of claim 16, the operations further comprising:

after execution commands to delete data that satisfies the query criteria, and before performing another iteration of an instance of the iterative process, unlocking the one or more leaf nodes.

18. The computing of claim 1, wherein the one or more leaf nodes comprise a plurality of leaf nodes and the generating commands to delete data that satisfies the query criteria are generated in parallel for the plurality of leaf nodes.

19. A method, implemented in a computing system comprising at least one memory and at least one hardware processor coupled to the at least one memory, the method comprising:

receiving a first set comprising a plurality of data objects, at least a portion of data objects of the plurality of data objects having a dependency on one or more other data objects of the plurality of data objects or being a subject of such a dependency, wherein (1) a dependency between two data objects of the plurality of data objects is defined by one or more attributes of a first data object of the two data objects that refer to a corresponding one or more attributes of a second data object of the two data objects (2) a dependency between two data objects has a direction such that the one or more attributes of the first data object are target attributes, the one or more attributes of the second data object are source attributes, and the target attributes point to the source attributes; and (3) at least a portion of data objects of the plurality of data objects comprise a timestamp attribute;

in an iterative process starting from a second set of data objects comprising the at least a portion of the data objects:

identifying one of more leaf nodes in the second set of data objects, wherein a leaf node corresponds to a data object of the second set of data objects that does not referentially constrain another data object of the second set of data objects;

for identified one or more leaf nodes, generating commands to delete data that satisfies query criteria, the query criteria comprising the timestamp attributes of the one or more leaf nodes;

at least temporarily removing data objects corresponding to the one or more leaf nodes from the second set of data objects;

determining whether the second set of data objects comprises additional data objects; and (1) when the second set of data objects comprises additional data objects, performing another iteration of the iterative process; or (2) when the second set of data objects does not comprise additional data objects, not performing another iteration of the iterative process.

20. One or more non-transitory computer-readable storage media comprising:

computer-executable instructions that, when executed by a computing system comprising at least one hardware processor and at least one memory coupled to the at least one hardware processor, cause the computing system to receive a first set comprising a plurality of data objects, at least a portion of data objects of the plurality of data objects having a dependency on one or more other data objects of the plurality of data objects or being a subject of such a dependency, wherein (1) a dependency between two data objects of the plurality of data objects is defined by one or more attributes of a first data object of the two data objects that refer to a corresponding one or more attributes of a second data object of the two data objects (2) a dependency between two data objects has a direction such that the one or more attributes of the first data object are target attributes, the one or more attributes of the second data object are source attributes, and the target attributes point to the source attributes; and (3) at least a portion of data objects of the plurality of data objects comprise a timestamp attribute;

computer-executable instructions that, when executed by the computing system, cause the computing system to, in an iterative process starting from a second set of data objects comprising the at least a portion of the data objects:

identify one of more leaf nodes in the second set of data objects, wherein a leaf node corresponds to a data object of the second set of data objects that does not referentially constrain another data object of the second set of data objects;

for identified one or more leaf nodes, generate commands to delete data that satisfies query criteria, the query criteria comprising the timestamp attributes of the one or more leaf nodes;

at least temporarily remove data objects corresponding to the one or more leaf nodes from the second set of data objects;

determine whether the second set of data objects comprises additional data objects; and (1) when the second set of data objects comprises additional data objects, performing another iteration of the iterative process; or (2) when the second set of data objects does not comprise additional data objects, not performing another iteration of the iterative process.

* * * * *